US008407216B2

(12) United States Patent
Walker et al.

(10) Patent No.: US 8,407,216 B2
(45) Date of Patent: Mar. 26, 2013

(54) AUTOMATED TAGGING OF OBJECTS IN DATABASES

(75) Inventors: Hubert M. Walker, Berkeley, CA (US); Noel C. Morrison, San Francisco, CA (US); Timothy Caplis, Oakland, CA (US); Scott Bedard, San Francisco, CA (US); Ankarino S. Lara, San Francisco, CA (US); Stephen James Blake, El Cerrito, CA (US)

(73) Assignee: Yahoo! Inc., Sunnyvale, CA (US)

( * ) Notice: Subject to any disclaimer, the term of this patent is extended or adjusted under 35 U.S.C. 154(b) by 543 days.

(21) Appl. No.: 12/238,320

(22) Filed: Sep. 25, 2008

(65) Prior Publication Data

US 2010/0082575 A1    Apr. 1, 2010

(51) Int. Cl.
*G06F 17/30* (2006.01)

(52) U.S. Cl. ........ 707/731; 707/728; 707/732; 707/736; 707/748; 707/750

(58) Field of Classification Search ........................ None
See application file for complete search history.

(56) References Cited

U.S. PATENT DOCUMENTS

| | | | | |
|---|---|---|---|---|
| 5,941,944 | A * | 8/1999 | Messerly ....................... | 709/203 |
| 6,009,459 | A * | 12/1999 | Belfiore et al. ............... | 709/203 |
| 6,122,647 | A * | 9/2000 | Horowitz et al. ............. | 715/205 |
| 6,199,081 | B1 * | 3/2001 | Meyerzon et al. ............ | 715/210 |
| 6,269,361 | B1 * | 7/2001 | Davis et al. ................... | 1/1 |
| 6,292,830 | B1 * | 9/2001 | Taylor et al. .................. | 709/224 |
| 6,314,451 | B1 * | 11/2001 | Landsman et al. ............ | 709/203 |
| 6,317,761 | B1 * | 11/2001 | Landsman et al. ............ | 715/205 |
| 6,356,899 | B1 * | 3/2002 | Chakrabarti et al. ......... | 707/737 |
| 6,466,940 | B1 * | 10/2002 | Mills ............................. | 1/1 |
| 6,466,967 | B2 * | 10/2002 | Landsman et al. ............ | 709/203 |
| 6,745,188 | B2 * | 6/2004 | Bradburn ....................... | 705/35 |
| 6,868,435 | B2 * | 3/2005 | Boys ............................. | 709/204 |
| 6,934,277 | B1 | 8/2005 | Werve et al. | |
| 6,987,221 | B2 | 1/2006 | Platt | |
| 7,114,146 | B2 * | 9/2006 | Zhang et al. .................. | 717/106 |
| 7,143,193 | B1 * | 11/2006 | Abbott et al. ................. | 709/248 |
| 7,162,473 | B2 * | 1/2007 | Dumais et al. ................ | 1/1 |
| 7,185,092 | B2 | 2/2007 | Furui et al. | |

(Continued)

OTHER PUBLICATIONS

Chen, Yen-Yu, et al., "Efficient Query Processing in Geographic Web Search Engines," ACM SIGMOD 2006, Jun. 27-29, 2006, pp. 277-288.*

(Continued)

*Primary Examiner* — Farhan Syed
(74) *Attorney, Agent, or Firm* — Martine Penilla Group, LLP

(57) ABSTRACT

Embodiments of the present invention provide systems and methods for automatically generating tag terms (or tags) for objects in databases of a web site. The metadata of the objects (or data) of the web site are processed and parsed to automatically generate tag terms for the corresponding objects. Information (or data, or content) downloaded from the Internet often comes with metadata, which can exist in titles, description, sources, and authors of the information, etc. The metadata of downloaded information can be process and parsed to generate tag terms for the corresponding objects. The system can automatically generate tag terms for the data, which are stored as objects in the databases, and make the data (or objects) searchable. In addition, the automatically generated tag terms allow associated data to maintain their relationship. For example, data from the same sources, same authors, or same subjects can be identified based on the common tag terms. Automatically generated tag terms enable searching and association of data (or objects) in databases in a web site.

17 Claims, 15 Drawing Sheets

U.S. PATENT DOCUMENTS

| | | | |
|---|---|---|---|
| 7,356,589 B2* | 4/2008 | Abbott et al. | 709/224 |
| 7,526,545 B2 | 4/2009 | Jerome | |
| 7,581,006 B1* | 8/2009 | Lara et al. | 709/226 |
| 7,664,830 B2* | 2/2010 | Rising, III | 709/218 |
| 7,685,195 B2* | 3/2010 | Pope | 707/722 |
| 7,725,422 B2* | 5/2010 | Ryan et al. | 1/1 |
| 7,769,648 B1* | 8/2010 | Nolan | 705/32 |
| 7,801,845 B1* | 9/2010 | King et al. | 707/608 |
| 7,933,864 B1* | 4/2011 | King et al. | 707/608 |
| 7,953,731 B2* | 5/2011 | Patel et al. | 707/723 |
| 7,970,750 B2* | 6/2011 | Goel et al. | 707/706 |
| 8,140,515 B2* | 3/2012 | Pradhan et al. | 707/711 |
| 2001/0042064 A1* | 11/2001 | Davis et al. | 707/3 |
| 2001/0047354 A1* | 11/2001 | Davis et al. | 707/3 |
| 2002/0147637 A1 | 10/2002 | Kraft et al. | |
| 2003/0028896 A1* | 2/2003 | Swart et al. | 725/127 |
| 2003/0038775 A1* | 2/2003 | Waller et al. | 345/156 |
| 2003/0187950 A1* | 10/2003 | Rising, III | 709/218 |
| 2004/0039733 A1* | 2/2004 | Soulanille | 707/3 |
| 2004/0078294 A1* | 4/2004 | Rollins et al. | 705/27 |
| 2004/0102248 A1 | 5/2004 | Young et al. | |
| 2004/0111484 A1 | 6/2004 | Young et al. | |
| 2004/0205558 A1* | 10/2004 | Holloway et al. | 715/513 |
| 2004/0220910 A1* | 11/2004 | Zang et al. | 707/3 |
| 2005/0021611 A1 | 1/2005 | Knapp et al. | |
| 2005/0223000 A1* | 10/2005 | Davis et al. | 707/5 |
| 2006/0004704 A1 | 1/2006 | Gross | |
| 2006/0041549 A1* | 2/2006 | Gundersen et al. | 707/5 |
| 2006/0218106 A1* | 9/2006 | Pope | 706/12 |
| 2007/0078842 A1* | 4/2007 | Zola et al. | 707/4 |
| 2007/0185858 A1* | 8/2007 | Lu et al. | 707/5 |
| 2007/0214133 A1* | 9/2007 | Liberty et al. | 707/5 |
| 2007/0282693 A1 | 12/2007 | Staib et al. | |
| 2008/0168135 A1* | 7/2008 | Redlich et al. | 709/204 |
| 2008/0195664 A1 | 8/2008 | Maharajh et al. | |
| 2008/0270882 A1* | 10/2008 | Rollins et al. | 715/208 |
| 2009/0037355 A1* | 2/2009 | Brave et al. | 706/45 |
| 2009/0100078 A1* | 4/2009 | Lai et al. | 707/100 |
| 2009/0234876 A1* | 9/2009 | Schigel et al. | 707/102 |
| 2009/0254529 A1 | 10/2009 | Goldentouch | |
| 2009/0327243 A1* | 12/2009 | Pradhan et al. | 707/3 |
| 2009/0327275 A1 | 12/2009 | Walker et al. | |
| 2009/0327923 A1 | 12/2009 | Walker et al. | |
| 2010/0030578 A1* | 2/2010 | Siddique et al. | 705/3 |
| 2010/0082573 A1 | 4/2010 | Canel et al. | |
| 2010/0082575 A1* | 4/2010 | Walker et al. | 707/706 |
| 2010/0082576 A1* | 4/2010 | Walker et al. | 707/706 |
| 2010/0131507 A1* | 5/2010 | Pradhan et al. | 707/737 |
| 2010/0268720 A1* | 10/2010 | Spivack et al. | 707/756 |
| 2010/0274753 A1* | 10/2010 | Liberty et al. | 706/50 |
| 2010/0311394 A1* | 12/2010 | Pomerantz et al. | 455/414.1 |
| 2011/0066615 A1* | 3/2011 | Pradhan et al. | 707/737 |
| 2011/0087660 A1* | 4/2011 | Yu et al. | 707/728 |
| 2011/0106829 A1* | 5/2011 | Pradhan et al. | 707/765 |
| 2012/0016857 A1* | 1/2012 | Gross et al. | 707/706 |
| 2012/0023084 A1* | 1/2012 | Lalji et al. | 707/706 |

OTHER PUBLICATIONS

Alpkocak, Adil, et al, "A Framework for Visual Information Retrieval on the Web," Dikuz Eylul University—Department of Computer Engineering, Izmir, Turkey, 2007, pp. 1-9.*

Langton, John and Das, Subrata, "A Framework for Building and Reasoning with Adaptive and Interoperable PMESII Models," Air Force Research Laboratory, AFRL-RI-RS-TR-2007-241, Nov. 2007, pp. 1-122.*

Hoebel, Natascha and Zicari, Roberto, "Creating User Profiles of Web Visitors using Zones, Weights, and Actions,"Jul. 21-24, 2008, 10th IEEE Conference on E-Commerce Technology, pp. 190-197.

Hung, Chia-Chuan, et al., "Tag-Based User Profiling for Social Media Recommendation," May 18, 2008, Association for the Advancement of Artificial Intelligence, pp. 49-55.

* cited by examiner

| ID | | Description | Tag(s) | Photo File |
|---|---|---|---|---|
| xxxxx | yyyyy | Yoda | Yoda, Episode 2 | photofile1 |
| ⋮ | ⋮ | ⋮ | ⋮ | ⋮ |
| ⋮ | ⋮ | ⋮ | ⋮ | ⋮ |
| ⋮ | | ⋮ | ⋮ | ⋮ |
| ⋮ | | ⋮ | ⋮ | ⋮ |

FIG. 2D

| Object ID | Title | Tag Terms | Data Type |
|---|---|---|---|
| 777136 | Family Guy – Star wars – Blue Harvest – Did You See it? | Family Guy, Star Wars, Blue Harvest, filmsinfocus, Youtube | M-J |
| 777148 | Family Guy Star Wats – R2D2 Shouting Abuse! | Family Guy, Star Wars, R2D2, Fatherjack 1973, YouTube, Fighting | M-JPEG |
| ⋮ | ⋮ | ⋮ | ⋮ |

FIG. 3A

AUTOMATED TAGGING OF OBJECTS IN DATABASES

CROSS REFERENCE TO RELATED APPLICATION

This application is related to U.S. patent application Ser. No. 12/165,537, entitled "Automated System and Method for Creating a Web Site Based on a Subject Using Information Available on the Internet," filed on Jun. 30, 2008, and U.S. patent application Ser. No. 12/165,548, entitled "Automated System and Method for Creating a Web Site Based on an Emerging Subject of Internet search," filed on Jun. 30, 2008. This application is also related to U.S. patent application Ser. No. 12/238,324, entitled "Associating Objects in the Databases by Rate-based Tagging," filed on the same date as the present invention. These related applications are incorporated herein by reference in its entirety for all purposes.

BACKGROUND OF THE INVENTION

1. Field of the Invention

The present invention relates to an automated system and method that searches the Internet for information to create a web site, which allows users of a web site to create tags to objects in database of the web site. More particularly, the present invention relates to utilizing the frequency of user created tags to establish a definitive association between two or more objects in the database of the web site.

2. Description of the Related Art

Internet web sites are built to provide information and services to meet demands of various Internet users. Internet web sites can provide information and services through, but not limited to, text, photos, videos, audio, and applications, such as games and interactive online tools. For example, some web sites provide transaction functions to achieve e-commerce goals. Web sites are built to achieve goals of owners of the web sites. The exemplary goals include, but are not limited to, attracting potential buyers, building brands, introducing products, information exchange, social networking, etc. Web site content is presented to users in web pages, typically written in HyperText Markup Language (HTML), which are accessible via Hypertext Transfer Protocol (HTTP). The content of the web sites is typically stored in databases, which are used to create web pages handled by programs run on web servers.

Constructing (or building) a web site can consume a lot of time and resources, such as people, hardware, and software. Builders of a web site need to decide what content is relevant and interesting to the target users. The builders also need to design the layout of the web site, decide the type of software and hardware needed, place data in databases, etc. After the web site is built, administrators are needed to maintain the operation of the web site, such as adding new content to the web site, deleting outdated, incorrect, or inappropriate content from the web site, and to keep the hardware systems running, etc. All these activities consume resources and time. Further, information relevant and interesting to Internet users evolves at a very fast pace. Global trends and internet user population also change constantly. Thus, Internet users demand updated and relevant content. If the content is not provided, users may go to other sites that provide the content they desire.

It is in this context that embodiments of the present invention arise.

SUMMARY OF THE INVENTION

Embodiments of the present invention provide systems and methods for automatically generating tag terms (or tags) for objects in databases of a web site. The metadata of the objects of the web site are processed and parsed to generate tag terms for the corresponding objects.

When content is newly identified by a search engine and is downloaded from Internet sites to a web site, it takes time for users to view and tag the content, which makes the content hard to search. Information (or data, or content) downloaded from the Internet often comes with metadata, which can exist in titles, description, sources, and authors of the information, etc. The metadata of downloaded information can be process and parsed to define tag terms for the corresponding objects. The system therefore automatically generates tag terms for the data, which are stored as objects in the databases, and make the data (or objects) searchable. In addition, the automatically generated tag terms allow associated data to maintain their relationship. For example, data from the same sources, same authors, or same subjects can be identified based on the common tag terms. Automatically generated tag terms enable searching and association of data (or objects) in databases in a web site.

It should be appreciated that the present invention can be implemented in numerous ways, including as a method, a system, or a device. Several inventive embodiments of the present invention are described below.

In one embodiment, a method for automatically generating tag terms for objects in databases of a web site that is automatically created based on a subject is provided. The method includes receiving a plurality of search terms related to the subject to create the website, and searching Internet web sites to identify information associated with the plurality of search terms on the Internet web sites to automatically create the web site. The method also includes storing an identified information associated with the plurality of search terms as an object to a database of the web site, and processing the identified information to determine which one of the plurality of search terms the identified information is associated with. Further, the method includes automatically generating a tag term for the identified information in the database using the one of the plurality of search terms determined to be associated with the identified information. In addition, the method includes processing and parsing any additional metadata of the identified information stored as an object to determine keywords to be used as additional tag terms for the identified information. Additionally, the method includes automatically storing the additional tag terms as automatically generated tag terms for the identified information in the database.

In another embodiment, computer readable media including program instructions for automatically generating tag terms for objects in databases of a web site that is automatically created based on a subject are provided. The computer readable media include program instructions for receiving a plurality of search terms related to the subject to create the web site, and program instructions for searching Internet web sites to identify information associated with the plurality of search terms on the Internet web sites to automatically create the web site. The computer readable media also include program instructions for storing an identified information associated with the plurality of search terms as an object to a database of the web site, and program instructions for processing the identified information to determine which one of the plurality of search terms the identified information is associated with. Further, the computer readable media include program instructions for automatically generating a tag term for the identified information in the database using the one of the plurality of search terms determined to be associated with the identified information. In addition, the computer readable media include program instructions for processing and parsing any additional metadata of the identified information stored as an object to determine keywords to be used as additional tag terms for the identified information. Additionally, the computer readable media include program instructions for automatically storing the additional tag terms for the identified information in the database.

In yet another embodiment, a system for automatically generating tag terms for objects in databases of a web site that is automatically created based oil a subject is provided. The system includes a search engine for searching information available on Internet based on a plurality of search keywords related to the subject of the web site to enable automatically creating the web site. The system also includes at least a server for storing objects in the databases of the web site. The objects in the databases are composed of information based on search results identified by the search engine to be associated with the plurality of search keywords. The system further includes a server with an algorithm to automatically generate tag terms from metadata of the objects to store in databases along with the objects. The automatically generated tag terms for the objects enable the objects to be searched and to be associated with one another.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 2D shows a photo database in the photo storage of FIG. 2B, in accordance with one embodiment of the present invention.

FIG. 3A a table storing tags (or tag terms) for objects, in accordance with one embodiment of the present invention.

DETAILED DESCRIPTION

Figure 1A:
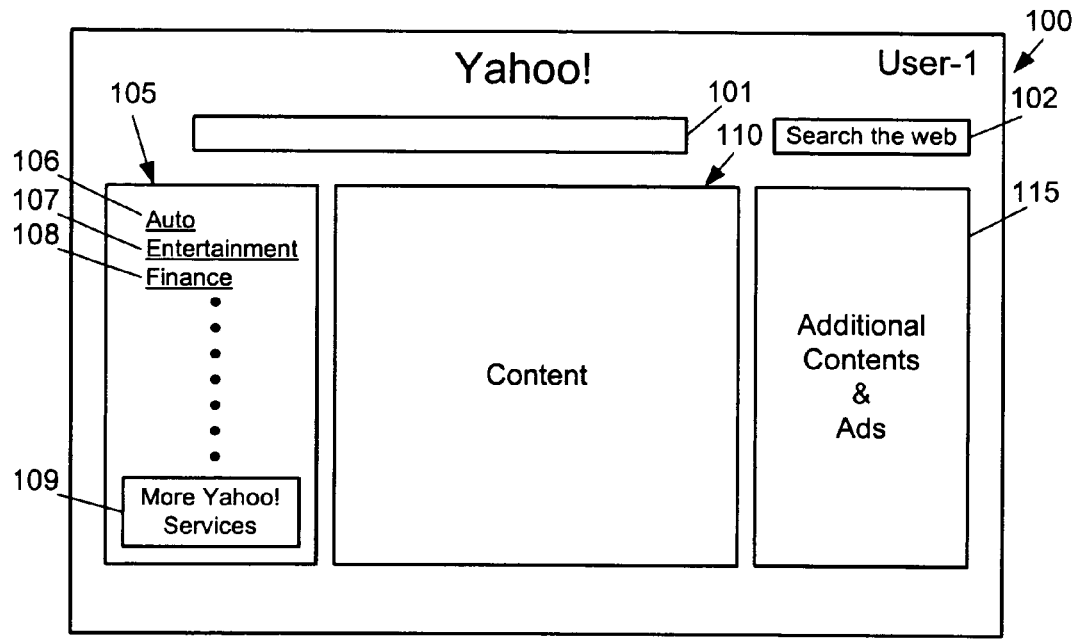
FIG. 1A shows an entry page of a portal for a user, in accordance with one embodiment of the present invention.

Embodiments of the present invention provide systems and methods for automatically generating tag terms (or tags) for objects in databases of a web site. The metadata of the objects (or data) of the web site are processed and parsed to become tag terms for the corresponding objects.

When content is newly identified by a search engine and is downloaded from Internet sites to a web site, it takes time for users to view and tag the content, which makes the content not searchable. Information (or data, or content) downloaded from the Internet often comes with metadata, which can exist in titles, description, sources, and authors of the information, etc. The metadata of downloaded information can be process and parsed to define tag terms for the corresponding objects. The system automatically generates tag terms for the data, which are stored as objects in the databases, and make the data (or objects) searchable. In addition, the automatically generated tag terms allow associated data to maintain their relationship. For example, data from the same sources, same authors, or same subjects can be identified based on the common tag terms. Automatically generated tag terms enable searching and association of data (or objects) in databases in a web site.

As described above, web sites are created to meet demands of various Internet users. One of the demands is to have a web site allow users interested in a particular subject to view information of the particular subject, to interact with one another through information exchange (e.g. sharing photos, videos, music, etc.), and to discuss topics related to the particular subject through tools (e.g. message boards, blogs, questions and answers, etc.).

For example, some movie series, such as Star Wars™, may have many devoted fans. Fans of Star Wars™ see Star Wars™ movies, read articles about the stories and characters of Star Wars™, view photos and videos of Star Wars™, and play with Star Wars™ games and toys. Some fans even join Star Wars™ conventions. These fans may actually crave more content related to the movie series. The devotion may in fact make them experts about story plots and characters of the movie series, and other subjects related to the movie series. These fans would be very interested in having a web site on the subject of "Star Wars™," where they can read obtain and share information about Star Wars™, and meet other Star Wars™ enthusiasts.

General portal sites, such as Yahoo!, or other entertainment-related, sports-related, or social-networking-related portal sites creates web sites that interest Internet users. A web site with a theme (or subject) (e.g. Star Wars™) that is of interest of many people would attract many Internet users to the site. As discussed above, constructing (or building) a web site can be very time and money consuming. Further, after the web site is built, administration is needed to maintain the operation of the web site, such as adding new content to the web site, deleting outdated, incorrect, or inappropriate content from the web site, and keep the hardware systems running, etc. All these activities require resources, such as paid administrators. Further, global trends, Internet user population, and information available on the Internet evolve at a very fast pace. Therefore, it would be desirable to have an automated system and method for creating and maintaining a site of a particular subject of interests to many people.

The figures and description below provide information regarding how an exemplary web site with a particular subject, such as "Star Wars™," which is of interest to numerous Internet users looks like. Systems and methods to automatically create such a web site are also provided. Other types of entertainment-based web sites can also be created with the systems and methods described below.

The Star Wars™ web site can be categorized under various categories, such as entertainment or movie, in a portal, such as Yahoo!. In the example here, the Star Wars™ web site is placed under "Entertainment" category in Yahoo!. FIG. 1A shows an entry page 100 of a portal, such as Yahoo!, for a user, User-1, in accordance with one embodiment of the present invention. A user, such as User-1, can access the entry-page 100 by type in the Uniform Resource Locator (URL) of the portal, such as "www.yahoo.com." The web site described here belongs to a portal. However, the concept of the invention is not limited to create a web site in a portal. The concept of the invention applies to creating any web site for users interested in a particular subject. The site is created to allow users to view information related to the subject, and to share (exchange) information.

In entry page 100, there is a search box 101 and a "Search The Web" button 102 near the top of page 100. User-1 can enter a search term, which can be a word or a phrase, in the search box 101 and push the "Search The Web" button 102 to initiate a search. In one embodiment, on the left side of entry page 100, there is a directory field 105, which includes a list of directories with different subjects and links, such as Auto link 106, Entertainment link 107, and Finance link 108, etc. Below the list of directories, there is a button 109 for "More Yahoo! Services," which can be clicked to access additional service directory not listed in the directory field 105. These directories are services provided by Yahoo!. They include many subjects, such as auto, entertainment, finance, games, weather, maps, and jobs, etc. In the middle of the entry page, there is a content field 110, which contains information for User-1 to view. On the right side of entry page 100, there is a field 115 with additional content and advertisements. User-1 can click on the Entertainment link 107 to access information services related to entertainment provided by Yahoo!.

Figure 1B:
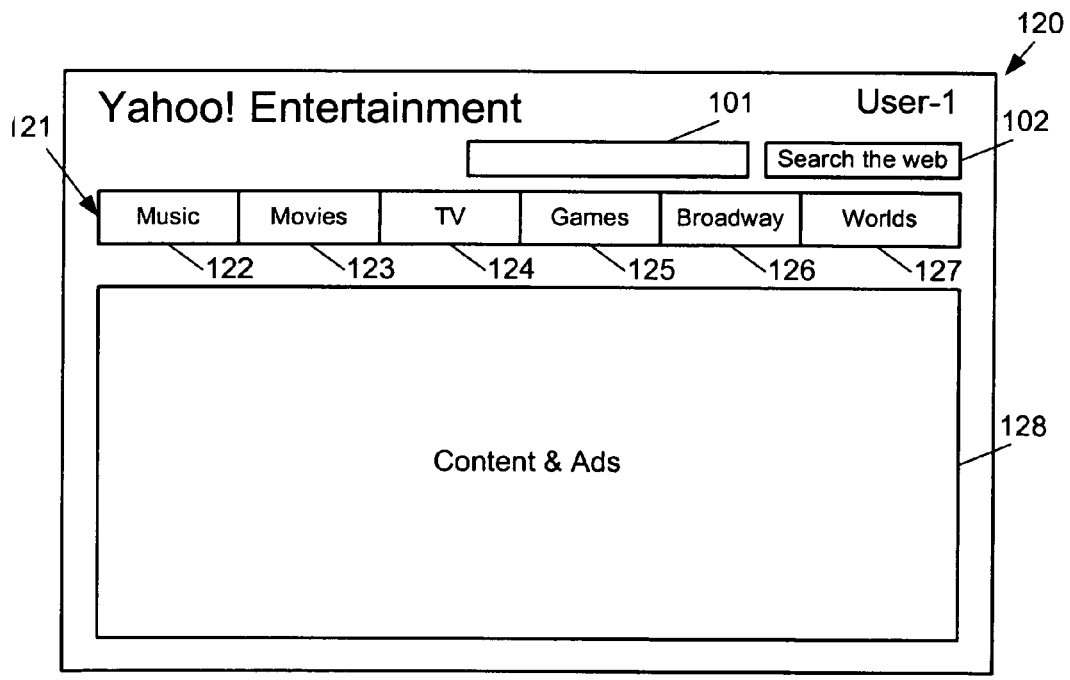
FIG. 1B shows an Entertainment entry page for a user, in accordance with one embodiment of the present invention.

After User-1 clicks on the Entertainment link 107, an Entertainment entry page 120 for the Yahoo! Entertainment directory is opened (as shown in FIG. 1B), in accordance with one embodiment of the present invention. The Entertainment entry page 120 includes a field 121 of links to different categories of entertainment, such as Music link 122, Movies link 123, TV link 124, Games link 125, Broadway link 126, and Worlds link 127, etc. The Music Link 122, when pressed, would take the user, such as User-1, to a web page with information related to music and music industry, and additional links to music-related subjects. Similarly, Movies link 123, TV link 124 and Games link 125 would take the user to web pages related to movies, TV shows, and video games.

The Worlds link 127 would take the user to a web page with information related to different "Worlds" created for different popular subjects that are related to the entertainment for online users. For example, the different "Worlds" include web site for Star Wars™ movies, which is named as "The World of Star Wars™", and web site for the movie "Titanic," which is named as "The World of Titanic," etc. The Entertainment entry page 120 also include a field 128 of content and ads, which has entertainment-related content and ads for User-1 to view.

Figure 1C:
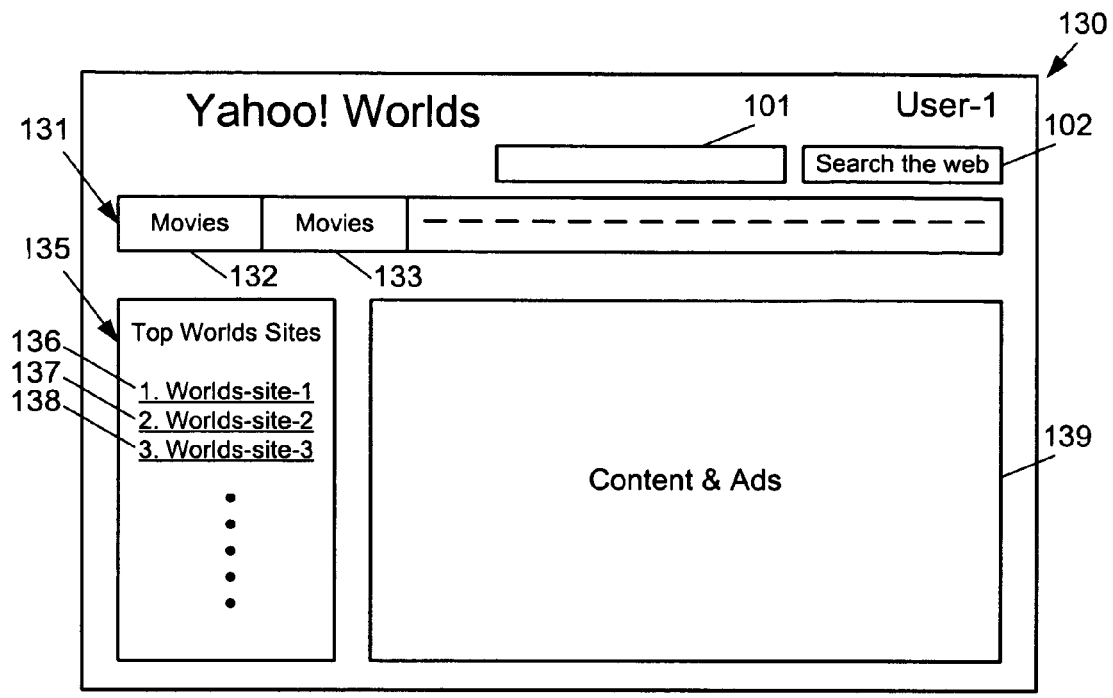
FIG. 1C shows a Worlds entry page for a user, in accordance with one embodiment of the present invention.

When User-1 clicks on the Worlds link 127, a Worlds entry page 130 is opened. In the Worlds entry page 130, there are web sites created for users based on different categories of entertainment, as shown in FIG. 1C in accordance with one embodiment of the present invention. Entry page 130 includes a directory field 131, which has a list of category links, such as link to Movies category 132, and link to Music category 133, etc. As mentioned, different sites are listed under different categories. For example, the site of "The World of Star Wars™" is listed under the category of "Movie," and can be accessed by pressing the link to Movies category 132. On the left side of entry page 130, there is a field 135 of top Worlds sites with a list of most popular sites under the "Worlds" category, such as Worlds-Site-1 136, Worlds-Site-2 137, and Worlds-Site-3 138, etc. In the middle of page 130, there is a field 139 of content and ads, which contain content related to the "Worlds," and ads for User-1 to view.

Figure 1D:
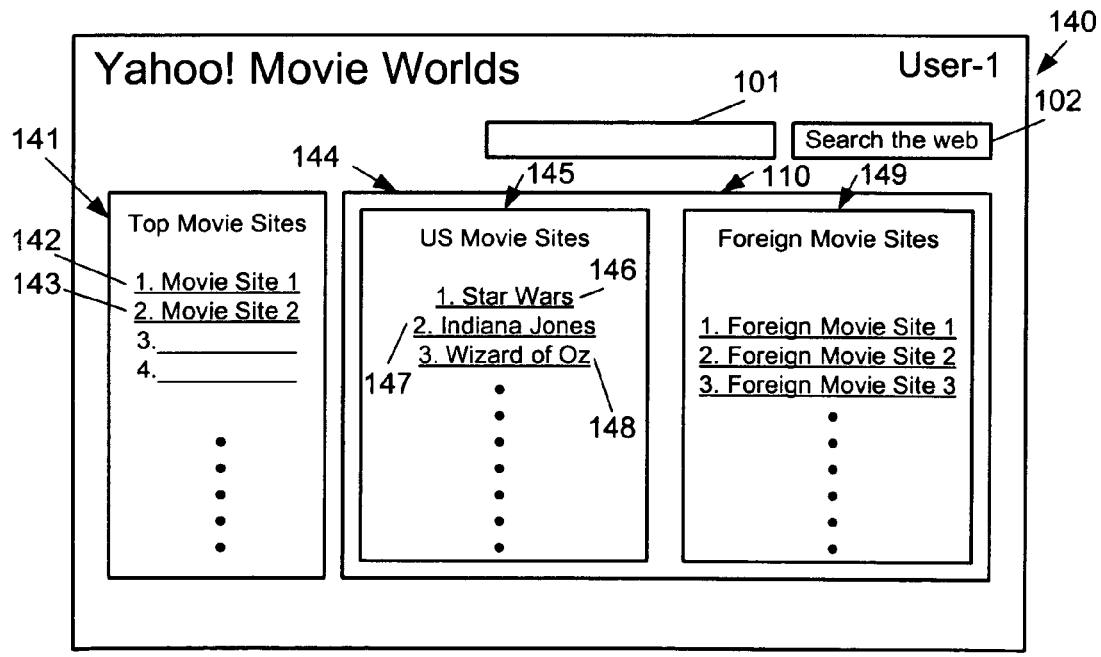
FIG. 1D shows the entry page of Movie Worlds, in accordance with one embodiment of the present invention.

To find a "Worlds" site of a particular subject, such as "The World of Star Wars™", site, User-1 can click on the link to Movies category 132. Alternatively, User-1 can click on the site link directly if the link to the site is available on the front page, such as among the links for the top Worlds sites in field 125. In the examples here, User-1 clicks on the link to Movies category 132 to access an entry page of Movie Worlds 140. FIG. 1D shows the entry page of Movie Worlds 140, in accordance with one embodiment of the present invention. In page 140, there is a field 141 for top movie sites, which includes a list (with links) of most popular (top) movie sites under the Worlds section of Yahoo! Entertainment. In the example shown in FIG. 1D, the top sites for the Movies Worlds are "Movie Site 1," and "Movie Site 2," etc. To the right of the field 141 for top movie sites, there is a field 144 for list of Worlds sites related to movies. In one embodiment, in field 144 there is an area 145 of US (United States) Movie Sites, which includes links to Worlds sites for US movies, such as "Star Wars™" 146, "Indiana Jones" 147, and "Wizard of Oz" 148, etc.

In field 144, there is also an area 149 for foreign Movie sites, which includes a list of Worlds sites related to foreign movies, such as "Foreign movie site 1," "Foreign movie site 2," etc. The two listings, US movies and foreign movies, are merely used as examples, other categorization of Worlds sites related to movies are also possible. For example, the Worlds sites related to movies can be categorized by the period of years the movie is released, such as 1980s, 1990s, etc., by the types of the movies, such as action, drama, and musical etc., or by alphabetical order of the titles, etc.

Figure 1E:
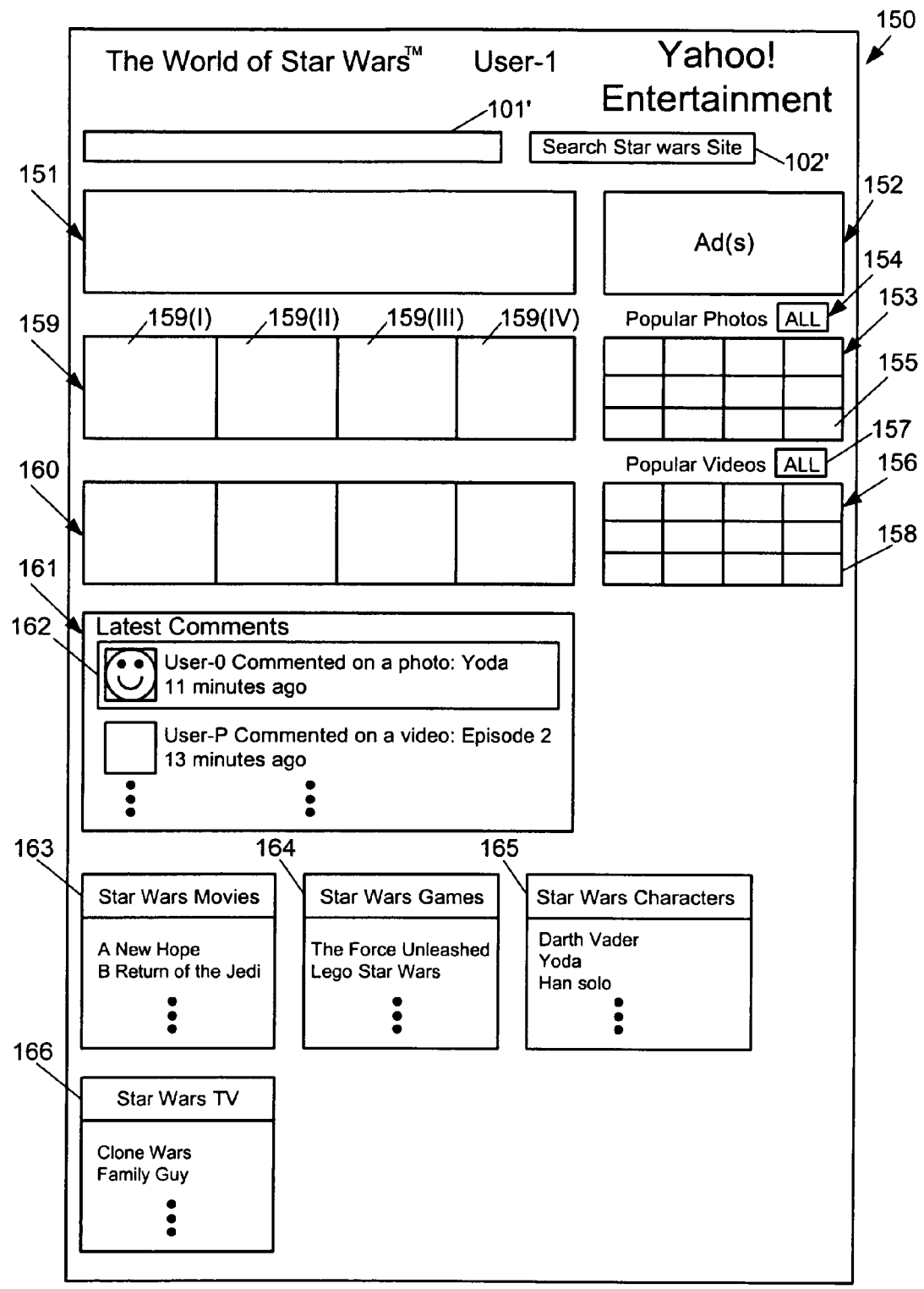
FIG. 1E shows an entry page for the Worlds site of Star Wars™, in accordance with one embodiment of the present invention.

When User-1 clicks on the link to "Star Wars™" 146, an entry page 150 for the Worlds site of Star Wars™ appears with the title of the page being "The World of Star Wars™" as shown in FIG. 1E, in accordance with one embodiment of the present invention. On entry page 150, there is a search box 101', which allow User-1 to enter a search key word, which can be a word or a phrase. Next to the search box 101', there is a search button 102', which, when pressed, allows User-1 to search for content in the current "The World of Star Wars™" site. The content in the current site include photos, videos, discussion boards, etc. Below the search box, there is an area 151 for lead article of Star Wars™, which can include text and photos related to the lead article. In one embodiment, the lead article can be uploaded by a user of the site, such as by the most active user or by the user who has uploaded the most photos and/or videos to the site, etc. In another embodiment, the lead article is assigned by an administrator of the site. Alternatively, other algorithm can be used to select lead article, such as by highest votes received from users of the group, etc.

To the right of the lead article, there is an area 152 for one or more advertisements. In one embodiment, the advertisements are related to Star Wars™. For example, the advertisements can be for sci-fi (science fiction) movies, Lego Star Wars™ toys, or other merchandize related to Star Wars™, etc. In another embodiment, the advertisements target the users of the Star Wars™ site. For example, the users might be mostly college-educated, and mostly male, etc.

Figure 1F:
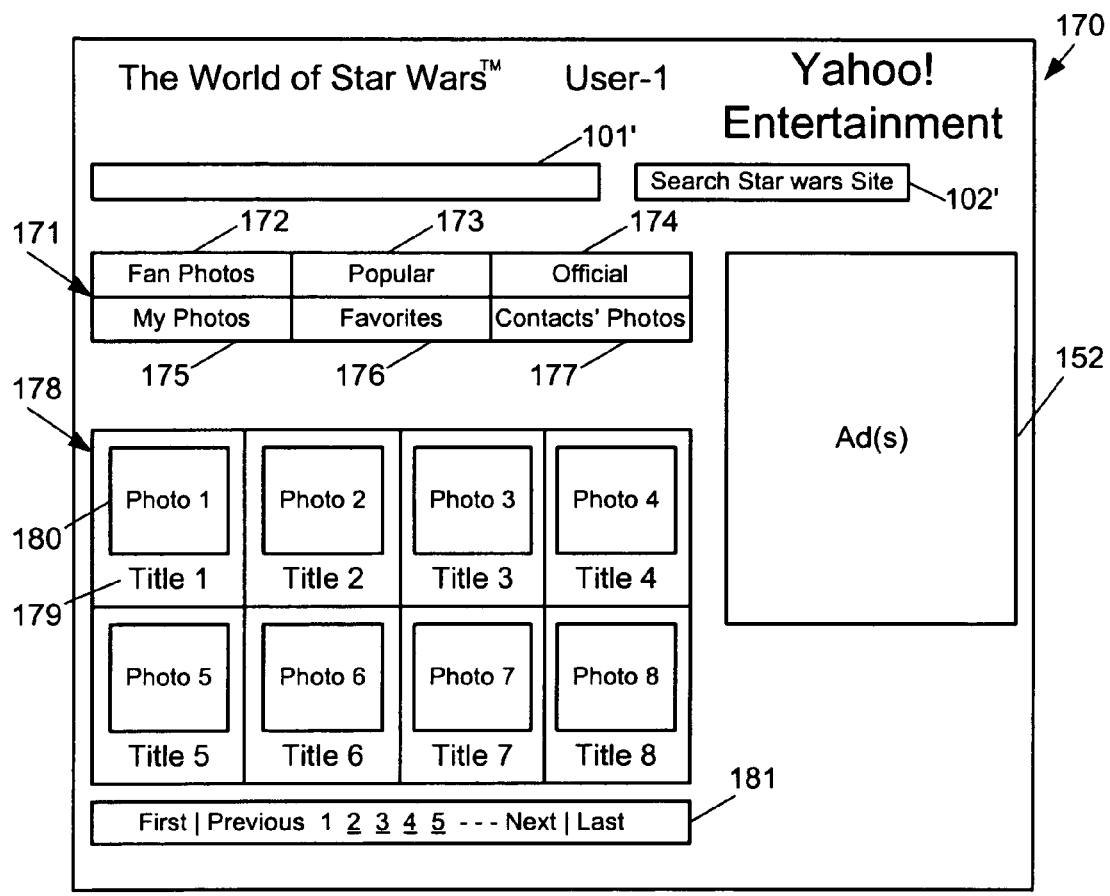
FIG. 1F shows a web page to access all photos in the Star Wars™ site, in accordance with one embodiment of the present invention.

Below the area 152 for ad(s), there is an area 153 for a number of popular photos related to Star Wars™. Area 153 is sub-divided into small sections, such as section 155. Each section, such as section 155, contains a photo related to Star Wars™. Above the area of popular photos, there is an "All" button 154. When the "All" button 154 is pressed, a page 170 to access all photos in the Star Wars™ site appear, as shown in FIG. 1F in accordance with one embodiment of the present invention. In page 170, the search box 101', search button 102', and the ad(s) area 152, that are similar to those on entry page 150, still exist. Under the search box 101', there is an area 171 with buttons for photos under different categories. For example, the buttons of categories can include "Fan photos" 172, which allows access to photos uploaded by fans, "Popular" 173, which allows quick access to most popular photos, and "Official" 174, which allows access to photos uploaded from official source(s), such as from Lucasfilm Limited. The buttons of categories can further include "my photos" 175, which allows access to photos uploaded by User-1, "Favorites" 176, which allows access to favorite photos marked by User-1, and "contacts' photos 177, which allows access to photos uploaded and/or marked as favorites by other users, who are in User-1's contact list. Below the area 171, there is a field 178 for photos, which is divided into a number of areas, such as area 179 in each area, such as area 179, there is a photo, such as "photo 1" 180, and a title, such as "Title 1", of the photo.

Below the field 178 for photos, there is an area 181 with links to access other pages of photos. For example, in area 181, there are links to different pages, such as links to pages 2, 3, 4, 5, previous page, next page, first page and last page, etc.

Figure 1G:
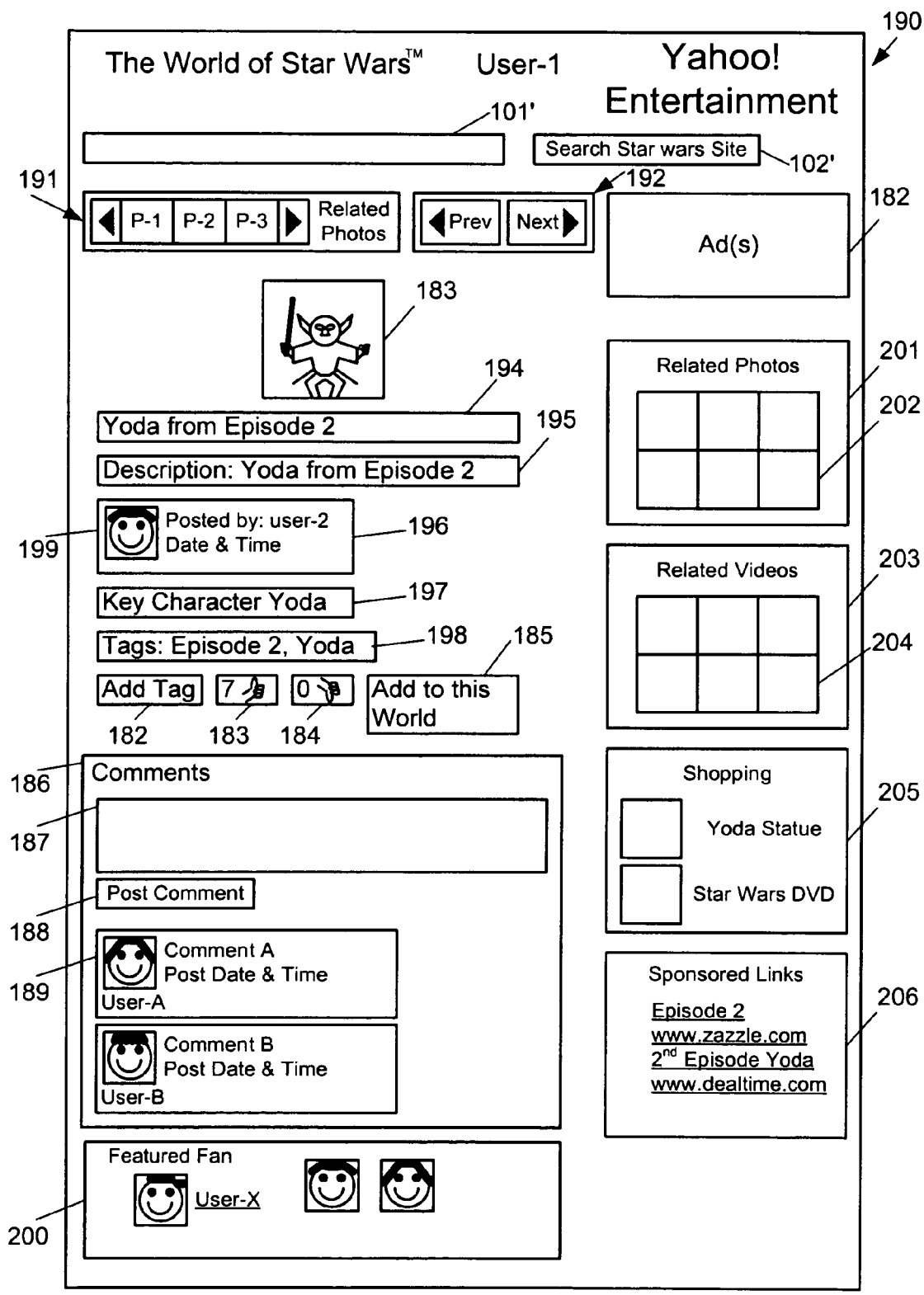
FIG. 1G shows a page with a selected photo, in accordance with one embodiment of the present invention.

Going back to FIG. 1E, area 153 has many sections, such as section 155, of photos. When User-1 clicks on a photo section, such as section 155, a page 190 with photo appears, as shown in FIG. 1G in accordance with one embodiment of the present invention. Alternatively, User-1 can also click on a photo, such as "photo 1" 180 of an area, such as area 179, in page 170 to access a photo. When User-1 clicks oln "photo 1" 180, a page similar to page 190 with photo would appear.

Page 190 includes the search box 101', search button 102', and the ad(s) area 152, that are similar to those on entry page 150. Below the search box, there is an area 191 that displays links to other photos, such as P-1, P-2, and P-3, that are related the photo 193 of this page. Photo 193 is the photo in either section 155 or area 179, which has been clicked by User-1. Next to the area 191, there is an area 192, which contains links, such as "Prev" for previous, and "Next" for next, to other pages of photos. At the center of page 190 is the photo 193, selected by User-1. Below the photo 193, there is a title field 194, which shows that the title of the photo 193 is "Yoda from episode 2". Page 190 also includes a description field 195, which provide further description of the photo. Below the description field, there is an area 196 listing the user who posts (or uploads) the photo 193 and the date and time that photo 193 is posted. In one embodiment, area 196 includes a photo or an avatar of the user who posts photo 193. In the example here, the user who posts photo 193 is User-2. Further, page 190 includes a field 197 of the character of the photo. In this example, the character is Yoda. However, this field is optional, since not all photos are related to characters of Star Wars™. In addition, page 190 includes a field 198 of tags, which lists the tags of photo 193. In the example here, the tags for photo 193 are "episode 2", and "Yoda".

Below the field 198 of tags, there is a button 182 for adding tag(s) by User-1. There is also a "thumb-up" button 183 for the user, such as User-1, to push if he/she thinks positive about the photo. There can be a total number of users who voted "thumb-up" for the photo. In the example here, 7 users have voted "thumb-up" for photo 193. Next to the "thumb-up" button 183, there is a "thumb-down" button 184. Further, there could be a button 185 of "add to this world", for users who have not signed up to be a member (or a user) of "The World of Star Wars™" to be become a member (or user). Users can push button 185 to become a member.

In one embodiment, there is an area 186 of comments on page 190. There is a box 187 that allows a user to enter comments. There is also a "post comment" button 188 to be pushed after the user enters the comments in box 187. In area 186 of comments, there also are a number of comments posted by different users. For example, comment 189 is posted by User-A. An avatar of User-A is shown, with a comment (comment A) posted by User-A, and the date and time the comment being posted are shown in area 186. Further, on page 190, there is an area 200 of featured fans, which shows the avatars of one or more fans of the current site. One of the fans can be placed at a more prominent spot with larger photo (or avatar) and name of the fan (or user) in area 200. In the example here, User-X takes the more prominent spot and two other fans are also featured in area 200.

In addition to all the features described above, an area 201 of related photos can also exist on page 190. In the area 201 of related photos, photos (with links) related to photo 193 are displayed in sections, such as section 202 in area 201. When a user clicks on the photo, which is also a link, in section 202, a page similar to page 190 with the photo would appear. Photos related photo 193 are tagged with one or more tag terms of photo 193. Photo 193 is tagged with tag terms that include "episode 2" and "Yoda." Therefore, any photo that is tagged with the term "episode 2" and/or "Yoda" can appear in area 201. If there are more photos than available sections, such as section 202 in area 201, links or buttons to other pages with additional photos can be available (not shown) for the user to click. Further, there can be an area 203 for related videos. Similar to related photos, related videos can appear in sections, such as section 204, in area 203. Related videos are videos tagged with at least one tag term of photo 193.

On page 190, there also can be an area 205 for shopping, where merchants display items on sale or links to web sites that carry merchandises. The merchandizes can be related to Star Wars™, Yoda, or other subjects that the merchants think a user, such as User-1, would be interested in. In the example here, Yoda statue and Star Wars' DVD are for sale in area 205. In the example shown in FIG. 1G, the photos of the merchandises are shown next to the brief descriptions of the merchandizes.

In addition, on page 190, there could be an area 206 of sponsored links for paying merchants or advertisers to place ads with links to web sites that offers products and/or services. In one embodiment, the products and services displayed in the area 206 are related to photo 193 or to other subjects of Star Wars™. In the example shown in FIG. 1G, a DVD of "Episode 2", and a toy of "$2^{nd}$ episode Yoda" are for sale.

Going back to FIG. 1E, page 150 can also include an area 159 for featured photos, which are selected from all photos in the site. In one embodiment, the featured photos are all centered on a theme or subject, such as Yoda, Han Solo, or episode 2. The theme or subject can be chosen based on popularity, by an administrator of the site, or by a selected user (for example, someone who is an active user of the site). Alternatively, the featured photos can be selected based on popularity and recency (newness), which means the newness of the photo. In one embodiment, the featured photos in area 159 are selected from all photos of the site based on an algorithm and are selected automatically based on the algorithm. This automatic selection allows the site to be maintained with no or minimal human intervention. In the example shown in FIG. 1E, area 159 is divided into 4 sections, such as sections $159_{(I)}$, $159_{(II)}$, $159_{(III)}$, and $159_{(IV)}$, where 4 photos are placed in the 4 sections.

In one embodiment page 150 of FIG. 1E can also include an area 160 for featured video, which are selected from all videos. Similar to featured photos, the featured videos can be selected by human or can be automatically selected based on an algorithm established by the administrator(s) or builder(s) of the site. Again, automatic selection of featured videos allows the site to be maintained with no or minimal human intervention.

In one embodiment, page 150 can also include an area 161 for "Latest comments" by users. In this area, latest comments from users are posted. For example, a comment by User-O is posted in area 162 within area 161. The user who makes the comment, what the comment is for and when the comment was made are listed in area 162.

At the bottom of page 150, there could be areas of different subjects. For example, area 163 is for Star Wars™ movies. A number Of links to Star Wars™ movies are listed, such as "A New Hope", and "Return of the Jedi." A user can click on the title and be presented with a page full of information, photos, videos, discussions and comments related to a Star Wars™ movie, such as "A New Hope" or "Return of the Jedi." Similar to area 163, area 164 is for Star Wars™ games, area 165 is for Star Wars™ characters, and area 166 is for Star Wars™ television shows (TV). When a user click on one of the link, information related to the link would be presented in a web page.

The description above shows how a Worlds site looks like. The building and maintaining of such a site would be described below.

As described above, creating and maintaining an entertainment-based web site, such as the Star Wars™ site, are very time and money consuming. The interests and taste of online users change very rapidly; therefore, it is desirable to have an automatic system and method to create and to maintain such a site to keep the content fresh and relevant. The content can be refreshed by new content from the Internet and can be added by users of the site. In addition, active users can perform the function of moderators or administrators of some sections or areas of the site. For example, as discussed in FIG. 1E, active users can be awarded with privilege to determine key article in area 151, featured photos in area 159, and featured videos in area 160. Alternatively, key article in area 151, featured photos in area 159, and featured videos in area 160 can be determined (or chosen) based on popularity and recency. If the site is constructed by an automated system and method, and is designed to be maintained by algorithms with the assistance of site users, minimal administration from a non-user administrator(s) is required. Further, the vast content (or information) of the Internet, which are updated regularly, and content contributed by users of the site can be utilized to keep the site relevant and updated to users of the site.

Figure 2A:
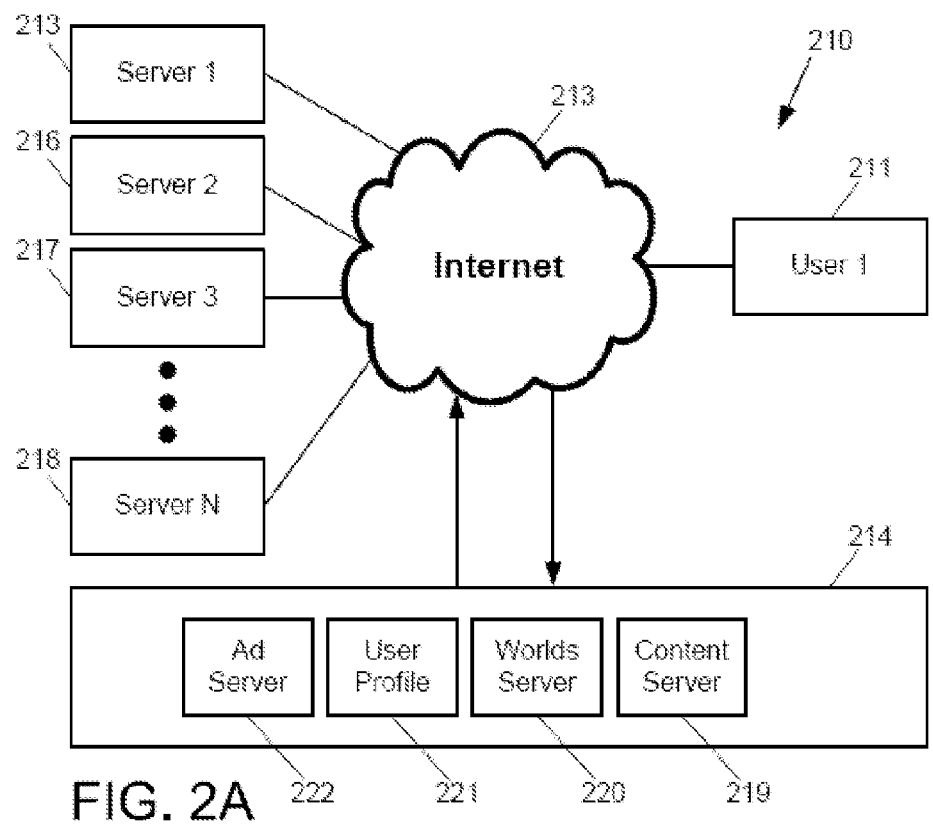
FIG. 2A shows a system for automatically creating a Worlds web site, in accordance with one embodiment of the present invention.

FIG. 2A shows a system 210 for automatically creating a Worlds web site, in accordance with one embodiment of the present invention; Although the description of system 210 is focused on creating a Worlds web site, the concept of the system can be used to create other types of web sites with subjects interesting to online users. System 210 includes a client system 211 for User-1, Internet 213, and a portal site 214. User-1 utilizes the client system 211 to interact with the system 214 of the portal site through Internet 213.

For example, User-1 can access entry pages, such as page 100, 120, 130, 140, 150, and 170, 190, and/or other pages that are offered by the portal site 214. The portal site 214 has a number of servers, such as a content server 219, which prepares content of pages, such as page 100, and a Worlds server 220, which prepares content of pages, such as pages 120, 130, 140, 150, 170, and 190, of a Worlds web site. The Worlds web site is a site within the portal site 214. Alternatively, the Worlds web site can reside outside the portal site 214. System 210 also includes a user profile server 221, which stores users' cookies and background information. The information in the user profile server 221 helps identify users and allows the content server 219 and the Worlds server 220 to provide content relevant to users, such as User-1. Further, system 210 has an ad server 222, which provides ads to content server 219 and Worlds server 220 to appear in web pages for users, such as User-1. Alternatively, there could be more than one Worlds servers, which are similar to Worlds server 220, to prepare content for other Worlds sites.

Worlds server 220 takes information from various servers, such as Server-1 215, Server-2 216, Server-3 217, and Server-N 218, connected to the Internet 213. The various servers can be any server on the Internet 213, as long as it provides information relevant to the Worlds web site created by Worlds server 220. Examples of servers that can provide information relevant to Worlds server 220 include, but not limited to, photo servers, such as Flickr, video servers, such as YouTube, music servers, Star Wars™ merchandise site, such as Lego, and the official Star Wars™ site (Starwars.com), etc.

When the subject (or theme) of the web site is determined, the design (or layout) of the web site should also be determine. For example, what types of information, such as photos, videos, music, etc., and what types of functionalities, such as discussion boards, blogs, user comments, etc., the site would offer. The design (layout) of the site determines the components of the storages and databases in the Worlds server 220. For example, if the layout of the site includes photos shown to users, then the Worlds server 220 for the site would have a photo storage.

Figure 2B:
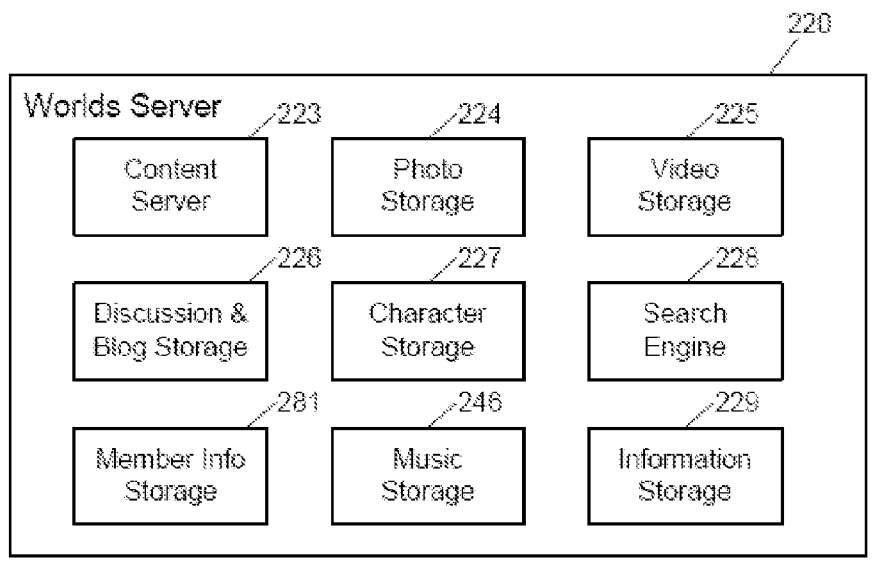
FIG. 2B shows the components in a Worlds server, in accordance with one embodiment of the present invention.

FIG. 2B shows the components in the Worlds server 220, in accordance with one embodiment of the present invention. "Worlds" server 220 includes a search engine 228, which allows the Worlds server 220 to index content of web sites, such as Server-1 215, Server-2 216, Server-3, 217, and Server-N 214, connected to the Internet. The search engine 228 identifies content available on the Internet that are relevant to web site created in the Worlds server 220. Worlds server 220 also includes a content server 223, which generates web pages with content for users of the Worlds web site, such as "The World of Star Wars™" site. In one embodiment, Worlds server 220 has one or more photo storages, such as photo storage 224, which store photos related to the subjects (or themes) of the Worlds web sites, for example "Star Wars™". The portal, such as Yahoo!, likely has a number of Worlds web sites under different themes (or subjects), such as Star Wars™, Indiana Jones, Wizard of Oz, etc. As mentioned above, alternatively content of different Worlds sites can reside on different servers. The photos for different Worlds web sites can be in the same photo storage (such as photo storage 224), where the databases in the storage organizes the photos for different Worlds web sites accordingly, or in different photos storages, where each storage holds photos for a particular Worlds web site.

Similar to photo storage 224, the Worlds server 220 also has one or more storages for video, such as video storage 225, which store videos for Worlds web sites. Similar to the photo storage 224, the videos for different Worlds web sites can be in the same video storage (such as video storage 225), where the databases in the storage organizes the videos for different Worlds web sites accordingly, or in different videos storages, where each storage holds videos for a particular Worlds web site. Further, the Worlds server 220 can have one or more storages for discussion boards and blogs, such as discussion and blog storage 226, which store discussion threads of various discussion boards and blogs. In addition, the Worlds server 220 can have one or more storages for main characters in Star Wars™, such as character storage 227, which stores descriptions and information of key characters of Star Wars™. For example, description and information related to Yoda and Han Solo can be stored in the character storage 227. If the Worlds web site is not related to a movie, the character storage 227 can be renamed for key player storage. For example, a Worlds site for a particular college basketball team would have a key player storage 227 that stores information or description about key players of the team for different years. Other types of information, such as music, comments, etc., can also be stored in various storages, such as information storage 229, in the Worlds server 220. In one embodiment, the information stored in the information storage 229 is text-based information, which is related to the subject of the site (Star Wars™). In one embodiment, the Worlds server 220 includes a music storage 244, which stores music files related to the subject of Star Wars™. The Worlds server 220 can also include a member info storage 281, which stores information related to members (or users) of the site. Photos and/or avatars of the users can be stored here or be stored in the photo storage 224.

The search engine 228 identifies content related to the search terms from the Internet to be placed into different storages, such as storages 224, 225, 226, 227, 229, and 244 of Worlds server 220. The placement of different types of files in different storages is according to file types. For example, well known photo file formats include, but not limited to, JPEG (Joint Photographic Experts Group), TIFF (Tagged Image File Format), GIF (Graphics Interchange Format), SVG (Scalable Vector Graphics), etc. Similarly, videos and music pieces also have their own file formats. The system can be set up to place files into different storages according to their formats. For example, photo files are placed in photo storage 224, and video files are placed in video storage 225, etc. In one embodiment, files can be placed in different storages according to file formats and/or sources of files. For example, files from YouTube.com are most likely to be videos and they are placed in video storage(s). In another embodiment, text-based content (or information, or files) found on Internet sites can be organized according to the types of the information to be placed in different storages. For example, if character description of characters, such as Yoda, is identified by the search engine 228 and its source becomes a feed with such information, the character description can be auto-populated in the character storage 227. Alternatively, some text-based and non-text-based information might require editorial and/or user-generated inputs.

Some storages, such as discussion and blog storage 226, might not be populated with content from the Internet. Instead, such storage, e.g. discussion and blog storage 226, are populated by content created by users of the site. For example, users choose topics for the discussion boards and blogs after the site is launched.

The content server 223 interact with various storages, such as storages 224, 225, 226, 227, and 229, in the Worlds server 220 to prepare web pages, such as pages 150, 170, and 190 discussed above, requested by users, such as User-1.

As discussed above, information that is interesting to users changes rapidly. It's very expansive to set up and maintain a site by dedicated personnel. Therefore, it's desirable to have an automated system and method to set up and maintain the Worlds site. The system is discussed above in FIGS. 2A and 2B. To set up the Worlds site, such as "The World of Star Wars™" site (or the "Star Wars™" site), a system administrator(s) can enter a number of key words or phrases to search for content (or information) on a number of web sites. For example, in setting up the Star Wars™ site, key words or phrases, such as Star Wars™, Darth Vader, Yoda, Han Solo, R2D2, C3PO, Princess Leia, etc, can be entered. The web sites to search for content can be any web sites that store information relevant to Star Wars™. For example, web sites, such as Flickr.com, could be searched for photos related to Star Wars™, and web sites, such as YouTube.com, could be searched for videos related to Star Wars™. In addition, the official "Starwars.com" site also have information regarding key characters of Star Wars™ which can be searched or downloaded. Some of these sites might allow their content to be downloaded (or embedded). Other sites might only allow posting links that point to content on their sites. Therefore, the storages mentioned above can store links to contents. For example, content from dig.com and del.icio.us often points to these two sites. Further, Yahoo!, the company that creates the Star Wars™ site, could enter a partnership with one of the sites that have content relevant to Star Wars™, such as Starwars.com. With the partnership, information sharing would be guided by the contract of the partnership.

Figure 2C:
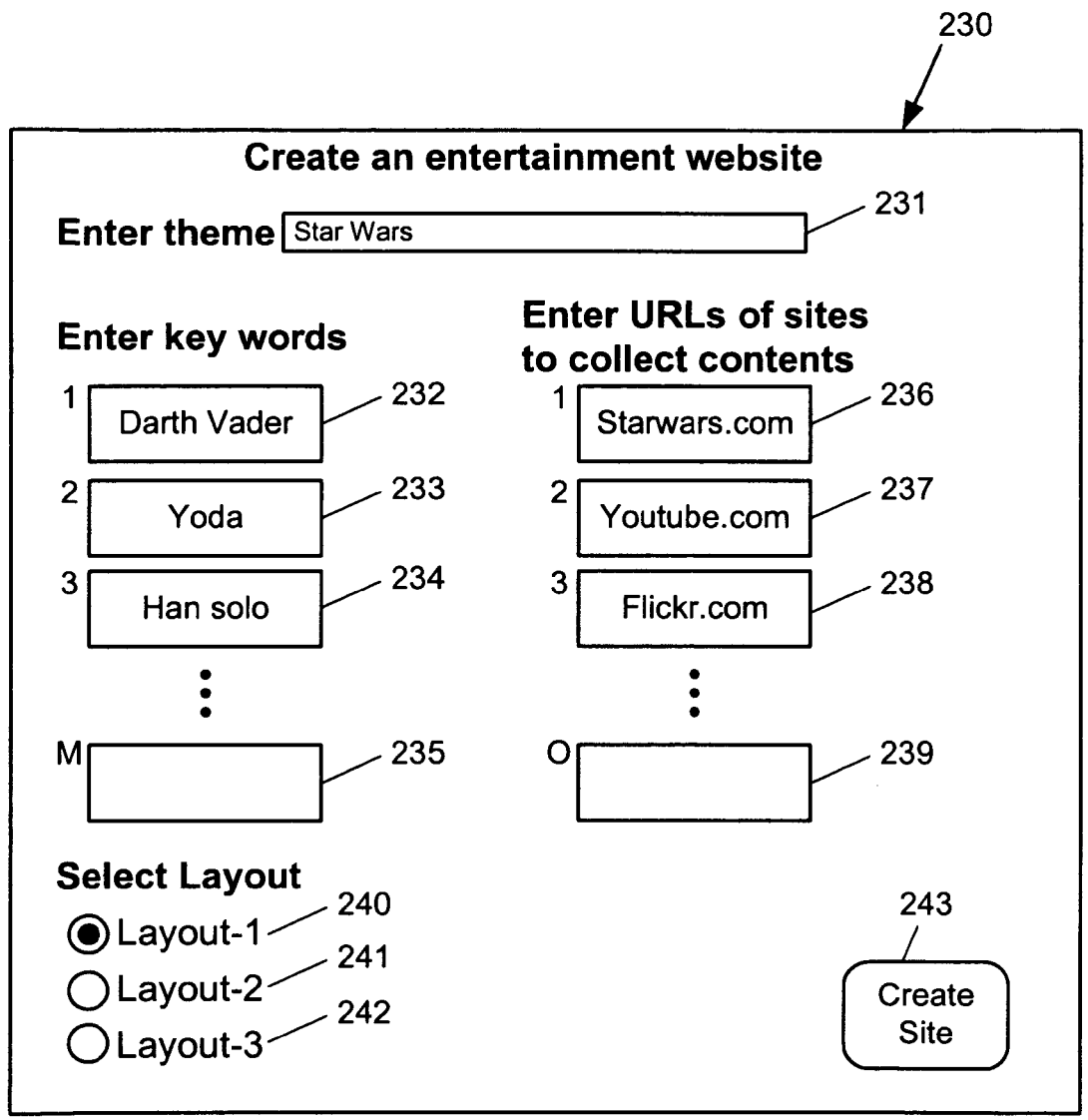
FIG. 2C shows a form that can be used by an administrator to create a web site based on a subject, in accordance with one embodiment of the present invention.

FIG. 2C shows a form 230 that can be used by an administrator(s) to create a web site based on a subject (or a theme), in accordance with one embodiment of the present invention. The subjects of the web site can be anything, as long as there are Internet users interesting in the subjects. For example, the subjects can be related to entertainment, sports, and music, etc. The number of Internet users interesting in the subjects that is considered to be sufficient can be determined by the owner(s) or sponsor(s) of such a site. For example, Yahoo! can determine that there are enough Internet users interested in Star Wars™ and creating "The World of Star Wars" site would drive traffic to Yahoo! site and bring advertising businesses to Yahoo!.

If the theme (or subject) of the site is "Star Wars™," the administrator(s) can use the form 230 to fill out the theme (or subject) of the site being created. In the example in FIG. 2C, the administrator enters "Star Wars™" in box 231. The administrator also enters key words or phrases in boxes, 231, 232, 233, to 234 (box M). For example, Darth Vader, Yoda, Han Solo, etc. The number (M) of boxes to enter search keywords, which can be words or phrases, can be as low as 1 and as high as possible, such as 100 or more. An example of number for M is 20. Other numbers, such as 30, or 40, are also possible. The number for M depends on the amount of time and hardware allocated for processing the feeds. With higher number of M, more time and more hardware are needed for processing the data related to the search keywords. The administrator can also use the 0.5 form 230 to fill out the uniform resource locators (URLs) of the web sites that could have content relevant to the site being created. In the example shown in FIG. 2C, the administrator enters URLs, such as "starwars.com" in box 236, "youtube.com" in box 237, "flickr.com" in box 238, and URLs of other web sites in other boxes (not shown), such as box 239 (box O). The number (O) of boxes to enter web sites for searching relevant content can be as low as 1 and as high as possible, such as 100 or more. An example of number for O is 20. Other numbers, such as 30, or 40, are also possible. The number for O depends on the amount of time and hardware allocated for processing the feeds. With higher number of O, more time and more hardware are needed for processing the data on higher number of web sites.

In one embodiment, the administrator can also select a layout plan for the web site from a list of layout selections. The layouts in the list of layout selection are pre-designed. A layout of a web site determines how the web pages look like when users of the web site request pages from the site, and what types of information and functionalities are offered to the users of the site. In one embodiment, the layout of the site determines the design of storages and databases of the site. In the example shown in FIG. 2C, the administrator chooses Layout-1 240 over Layout-2 241, and Layout-3 242. It is assumed that the administrator knows the design of layout-1 240, layout-2 241, and layout-3 242. After all information needed to create the site is entered, the administrator can push a button 243 to create the site. Once the button is pushed, the Worlds server 220 would start collecting content from the web sites identified. The "Star Wars™" web site can be created and be populated with the content retrieved from the web sites identified. Alternatively, the content search can happen first and the layout plan can be selected after initial content searched is performed.

After the web site is created and launched, and users start to use the site, users can contribute content to the site by participating in the discussion boards and blogs. In addition, users can also upload files, such as photo files and videos files, to the site to share with other users. Users can also help "tag" the content of the web site to make content of the site more searchable. For example, a user who sees a "Yoda" picture could add the tag "jedi" to indicate that Yoda is a Jedi. This allows the picture (or photo) to be associated with the term "jedi," and the photo to be searched by entering the term "jedi," into the search engine of the web site. The original tagging of the photo might not include the term "jedi". The user's adding (or creation) of the tag term "jedi" provides addition metadata to the photo. With the participation of users, the content of the web site can increase rapidly and be continuously updated. Users' participation is very important for such a site. Users' knowledge of content in the site can help the site be more interesting, updated, and more searchable.

In one embodiment, users' activities affect information displayed in the site. As discussed above, the most popular site content, such as photos, videos, and discussion boards, are highlighted in more prominent places on the web pages of the web site. For example, the lead article in area 151, featured photos in area 159, and featured videos in area 160 can be selected by users who are most active on the site, i.e. by users who make a lot of comments, upload many photos and videos, etc. Of course, the lead article in area 151, featured photos in area 159, and featured videos in area 160 can also be selected based on other algorithms. Another example is the latest comment by users in area 161 of FIG. 1E. Showing users' inputs, comments, and activities and allowing users' activities and involvement in the site to affect site content would encourage users to be more involved in the site, would increase traffic to the site and would make users more loyal to the site.

The photos, videos, and other types of information that are found relevant to the main subject of Star Wars™ can be down-loaded to the Star Wars™ site described here and be placed in the various storages, such as storages 224, 225, 226, 227, and 229, described above. Of course, content is only downloaded only legally and/or with approval. In addition, the content of the site, such as photos, videos, etc., that are entered and/or uploaded by the users are also stored in the various storages, such as storages 224, 225, 226, 227, and 229, described above. The content contributed by the users become content of the site and can be viewed and commented by all users of the site.

As mentioned above, web pages of the web site, such as pages 150, 170, and 190, have search boxes that allow users to search for content in the web site. The search engine 228 of Worlds server 228 also indexes content of "The World of Star Wars™" web site created by and in the Worlds server 220. The search index created by the search engine 228 allows users of the site to search for content on the web sites. Searching for content with text, such as description of characters, discussion boards, and blogs, is relatively straightforward, since the text of such content is searchable. When users enter keywords, content with text that contains the keywords would be identified. However, non-text-based content of the site, such as photos, and music, etc., need to be tagged with words or phrases to allow (or enable) searching. The tags for non-text-based files, such as photos, videos and music pieces, can come from the sources of these files. For example, photos at Flickr.com are often tagged. Many web sites that store non-text-based files, such as photos, videos, and music, set up their systems to allow users to tag the files. For example, the tags can be entered by the people who upload the photo files to Flickr.com. Alternatively, titles and description of non-text-based files, such as photos, videos, and music pieces, etc., are text-based and can be considered as tags too. The original tags can be imported along with the photo files and be downloaded to the photo storage(s) 224 in the Worlds server 220 along with the photos. These user tags are also very valuable and can be stored to enable searching of the non-text-based files.

FIG. 2D shows a photo database 250 in the photo storage 224 of FIG. 2B, in accordance with one embodiment of the present invention. Photo database 250 stores photo files, which can be downloaded from the Internet or uploaded by users of the Star Wars™ site. Photo database 250 has an identification (ID) column 251, which stores IDs of photo files, a description column 254, which stores a brief description of the photo file, a tag column 255, which stores tags related to the photo files, and a photo file column 256, which stores the photo files. In one embodiment, each ID in the ID column 251 is made up of two sets of identifications, source ID 252 and photo ID 253. Source ID 252 indicates the source of the photo file. For example, if the photo file, such as photo file 1 257, is downloaded from a site, such as Flickr.com. The source ID 252 is an ID, which is "xxxxx" in the current example, assigned by the Star Wars™ site to Flickr.com. Yahoo! can assign a unique ID to each external site (or source site). If the photo is uploaded by a user, the unique ID of the user, which is given by Yahoo!, can be used. The photo ID 253 is an ID associated with the photo file 257. In one embodiment, the photo ID is taken from the source site, such as Flickr.com. Normally, each photo file has an ID assigned. If an ID is not associated with a photo file, a title and/or a post-date can be used to identify the photo. If the photo file is uploaded by a user, Yahoo! can assign an ID to the photo file.

In the current example, the photo ID of photo file 257 is "yyyyy," which can be an ID that comes with the photo from the downloading site and is an ID associated with the photo on the downloading site. If the photo is uploaded to the web site by a user, the photo ID can be an ID associated with the photo or be assigned by the web site or by the user. The source ID 252 and photo ID 253 can be made up of numbers, alphabets, or a combination of both. The combined source ID 252 and photo ID 253 of each photo file makes a unique ID for the photo file. The unique ID of each photo file allows the photo file to be uniquely identified. When the search engine of Star Wars™ site performs searches of photo files in the identified sites, even if the photo IDs of two different photo files from two different sites are the same, the IDs of these two photos would be different due to different source IDs assigned to different sites.

The description column 254 stores description of the photo file. For example, the description of photo file 257 is "Yoda." Typically, there is a description (or title) associated with a photo. If the photo is downloaded from another site, the description (or title) can come with the photo. If the photo is uploaded by the user, the user can enter a description (or title) for the photo. In addition, the tags for photo file 257 are "yoda," and "episode 2." Both the term "yoda" and the term "episode 2" help describe the photo 257. When a user conducts a search on the web site using a search term that matches one of the tags of the photo, the photo would be identified. Alternatively, the search term does not need to match the full tag term. Matching of partial term would allow the identification of the photo. For example, when a user types in "episode 1" as a search term, photo file 257 could be identified, since photo file 257 has a tag term "episode 2" that has a word "episode" matching part of the search term 'episode 3.'" Since the match is not exact, photo file 257 would appear below other photos, videos, or other types of files that have tags matching better (or closer) to "episode 3." Fable 250 is filled with various photo files with corresponding IDs, descriptions, tags, and photo files.

Similar to a photo database 250, the video storage 225 can also has video databases organized in a manner similar to the photo database 250. The video files in the video database can also have unique IDs based on a combination of source IDs and video IDs. Any content files that are downloaded can be stored in the manner described above for FIG. 2D. Unique IDs of the downloaded files also allow the downloaded files to be uniquely stored in the databases and to avoid downloading a file multiple times. For example, search engine 228 indexes the web sites for content continuously. A photo file that has been indexed and downloaded would not be downloaded again, since the unique ID of photo file is stored in the database. Before the server 220 downloads a file, server 220 would check the ID of the file with IDs of files stored in the system. If the ID already exists in the system, server 220 would not download the file again.

The tags associated with photos, videos, music, and other types of files stored on the Star Wars™ site allow these non-text-based files to be searchable by users of the site. Text-based files can also be tagged. Tagging of text-based files can also assist searching. Usually, the tags of text-based files are given higher weights than the text in the text-based files. As mentioned above in box 182 of FIG. 1G, tags can also be added by users of the current Star Wars™ site. To avoid some users abusing the tagging function to enter offensive tags and/or incorrect tags, the system can be set up with algorithms to allow some users with good track records (or approved users) with unlimited tagging capability, while allowing new users and/or un-proven users limited tagging capability. For example, the tagging by un-proven users is only approved when more than one users tag the item with the same terms. The tagged terms can also be first checked to screen out offensive terms by a checking tool.

Figure 2E:
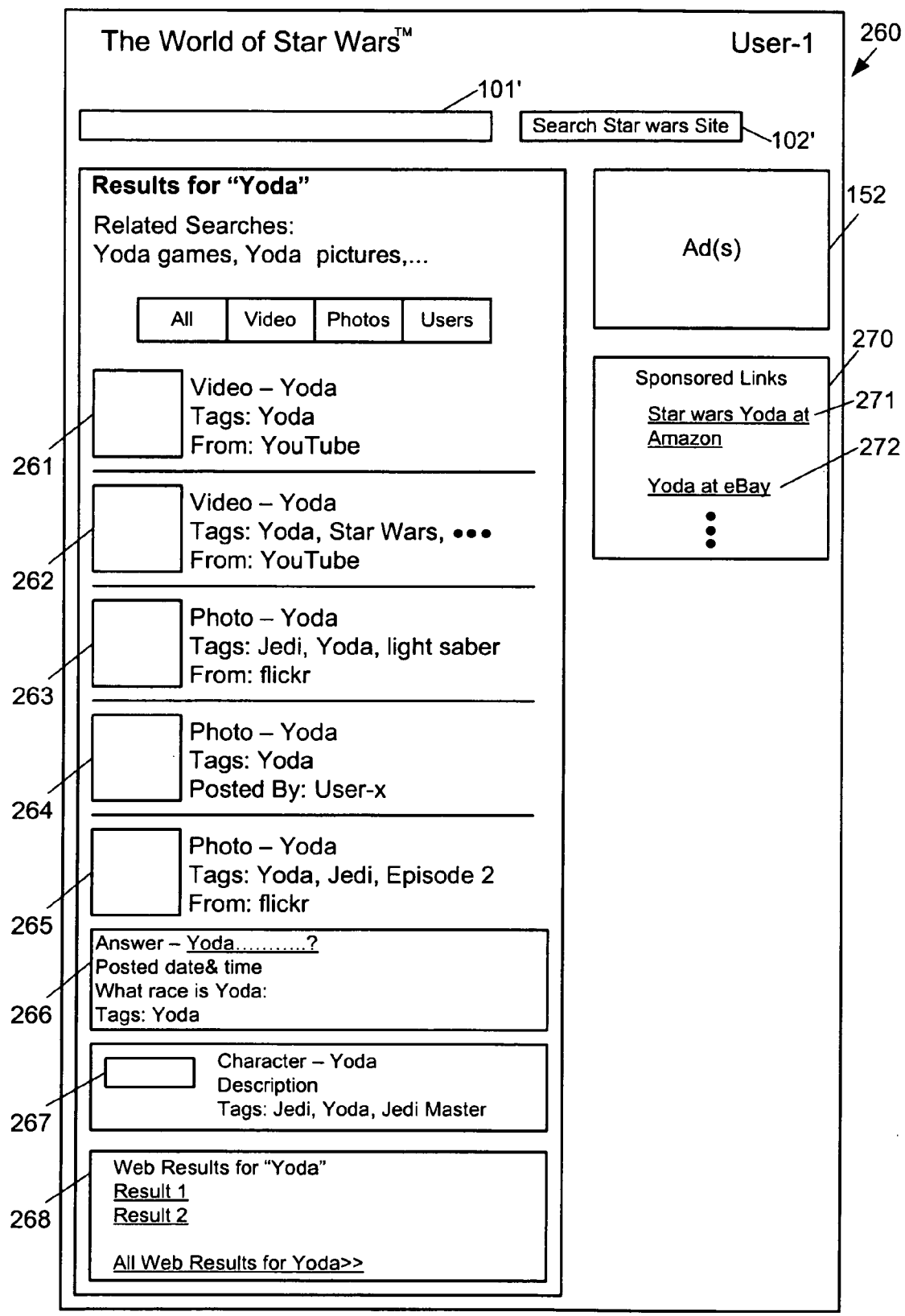
FIG. 2E shows a search result page for the search term "yoda," in accordance with one embodiment of the present invention.

FIG. 2E shows a search result page 260 for the search term "yoda," in accordance with one embodiment of the present invention. Page 260 is returned when a user, such as User-1, enters the term "yoda" in the search box 101' of FIG. 1F, 1F, or 1G. The result page 260 contains a number of results that include video(s), photo(s), and character tagged with the term "yoda", and text containing the term "yoda." In the example shown in the result page 260, the search results include two videos 261, 262, three photos 263, 264, 265, an answer 266 to a question related to "yoda", and a character description 267 of the character "Yoda" in Star Wars™ Each video (261 or 262) contains tags and source of the video. For example, video 261 is tagged with the term "yoda", while video 262 is tagged with terms including "yoda", and "star wars," etc. Videos 261 and 262 are both from "YouTube.com." Similar to videos, photos 263, 264, and 265 are also tagged and the sources of the photos are also listed. In one embodiment, brief descriptions (not shown) for videos (261, 262), and photos (263, 264, and 265) are included.

The answer 266 has a link 268, which can be clicked to display the full question and answers for the question. The answer 226 is listed in the search result because the question for the answer 266 is related to "yoda." In the example shown in FIG. 2E, the latest posting date and time for an answer to the question in answer 266 is listed. Below the posting date and time, the question of "What race is Yoda?" is listed. Below the question, the tag(s) for the answer 266 is listed to be "yoda." The character description 267 includes the character name "Yoda," and a description of character "Yoda." The tags for the character are also included.

Below the research results, there are additional pages, such as 2, 3, 4, 5, next, previous, first, and last, containing search results of "yoda". In one embodiment, at the bottom of the result page 260, an area 269 with a list of search results related to "yoda" found from the Internet (or Web) is included. For fans that are enthusiastic about Star Wars™, the searching capability on the Star Wars™ site allows them to find the things, such as photos, videos, discussions, etc., related to Star Wars™. On the right side of page 260, there could be an ad area 152 and an area 270 listing sponsored links related to the search term "yoda." In area 270 of FIG. 2E, an exemplary link 271 with "Star Wars™ Yoda of Amazon," and an exemplary link 272 with "Yoda at eBay" are shown. Site owner of "The World of Star Wars™," such as Yahoo!, can make financial gains from the ads and sponsored links displayed in area 152 and area 271. Advertisers often pay to display sponsored links (or results) based on matching keywords, which can be words or phrases.

In addition to enabling search, tags of objects, such as photos, videos, music pieces, etc., in databases in the web site, tags can also be used to associate different objects in the databases. As described in FIG. 2C, a few terms, such as Star Wars™, Darth Vader, Yoda, Han Solo, etc., are used to search for contents available on the Internet. Text-based content that includes text or metadata related to one of these terms, and non-text-based content that has metadata associated with one of these terms are identified by search engine 228 of FIG. 2B to be content (or data) for the site. The identified content is stored in the databases of the web site as objects. As mentioned above, the web site can be set up to allow users to help "tag" the content, which is stored as objects in the databases, of the web site to make the content more searchable.

Tags for content is a form of metadata. Metadata (meta data, or sometimes metainformation) is "data about data". Metadata is used to facilitate the understanding, characteristics, and management usage of data. For example, the data (or information) under ID column 251, description column 254, and tag(s) column 255, and photo file column 256 of FIG. 2D are metadata. ID, description, tags and name of file of an object contain information related to the data (or file, or object). When content on the Internet is identified to have relevant information related to the search terms, such as Star Wars™, Darth Vader, Yoda, and Han Solo, etc., described in FIG. 2C, the content can be downloaded into the databases of the web site. In one embodiment, the identified content is related to one of the terms used for Internet search. For example, the content can be related to the more general term Star Wars™, or to the more specific term Darth Vader. If the content is text-based, such as an article, the term, such as Star Wars™ or Darth Vader, etc., entered in the search can be in the main text or in the metadata, such as title, description, tags, sources, and authors of the content, such as the article. In one embodiment, file names of data files can be treated as metadata of the files. If the content is non-text-based, such as a video, the term, such as Star Wars™ or Darth Vader, etc., entered in the search must be in the metadata, such as title, description, or tags, of the video. The metadata of the data (or information), that are available on the Internet and are relevant to the Star Wars™, site enable the data to be identified by the search engine 228 of the Star Wars™ web site.

The metadata of the data identified by the search engine from the Internet or uploaded by users can be added as tags of the data to enable the data to be searchable on the Star Wars™ site. As mentioned above, the metadata of the data identified could be title, description, or tags of the data. The tags associated with the data identified on the Internet, can be entered in the database(s) of the Star Wars™ site as tags for the data, which are stored as objects in the database(s). As mentioned above, the titles and descriptions associated with data on the web sites on Internet are also indexed by the search engine, such as search engine 228, and be treated (or become) as metadata of the data. The information in the titles and descriptions of the data describes the data and can be parsed and stored as tags of the data. For example, a video from "YouTube.com", found by the search engine, could have a title of "Family Guy—Star Wars—Blue Harvest" The video is a clip of the Emmy-nominated hour-long premiere of the FOX television (TV) series "Family Guy", titled "Blue Harvest." The "Blue Harvest" episode is a retelling and spoof of Star Wars™ Episode IV: A New Hope, recasting the show's characters into Star Wars™ roles. The name "Blue Harvest" is a reference to the title of the film used to ensure secrecy and disguise the actual 1983 production of Star Wars™ Episode VI: Return of the Jedi. The video does not come with existing tags. However, the title can be parsed to identify terms with meanings, including "Family Guy," "Star Wars," and "Blue Harvest." These three terms with meanings can add information to the video; therefore, they can be added to tags (or tag terms) for the video to allow the video to be searchable under these tag terms.

Other video clips of the Family Guy Blue Harvest episode that are posted on YouTube.com can also be identified by the search engien of the Star Wars™ site. These identified video can have titles, descriptions, and/or tags that reveal that the videos are related to "Family Guy," "Blue Harvest" episode, or "Star Wars™." Inheriting tages of these videos found on YouTube.com, and parsing titles and/or descriptions of these videos add tag terms (or tags) that have meanings relevant to the videos. These inherited tags and added tags are not added by users. Instead, they are generated by the system automatically for the videos. Other types of contents, such as text-based articles, or non-text-based photos and music pieces, can also add tags that are automatically generated by using the metadata downloaded or uploaded with the content. Automatically generated tags enable objects in the databases to be searchable without waiting for user-added tags. This is especially useful when the site is newly launched or when the data are newly added to the site when limited number of users are exposed to the data.

In addition to titles and descriptions, the originating locations (or sources) of the data can be parsed to become tag terms. For example, if the source is "YouTube.com," "YouTube" can also be a tag term to allow users to search for contents on the site from YouTube.com. Further, the author of the content can also become a tag term. For example, a User-X always adds many photos related to Star Wars™ on Flickr.com. These photos are found by the search engine of the Star Wars™ site and the identified photos become content of the site. After User-1 sees one of User-X's photo on the Star Wars™ site and like it, User-A might decide that he/she would like to see more photos uploaded or posted by User-X. Adding authors' (or posters') names as tags to objects (or data) allow the objects (or data) to be searched under the authors' names. Other types of applicable metadata associated with the data can potentially be added as tags. Administrators of the site can determine what types of metadata coming with the data to be parsed to become tags of the data.

FIG. 3A shows a table 300 of tag terms (or tags) for different objects (or data) in a database of the web site, in accordance with one embodiment of the present invention. Table 30 has a column 301 of object identification (ID), a column 302 of title, a column 303 of tag terms (or tags), and a column 304 file (data) type. Table 300 has a row 311 for a video related to the Family Guy Blue Harvest episode mentioned above. Row 311 has an object ID of 777136, a title of "Family Guy—Star Wars—Blue Harvest—Did you see it?", tag terms of "Family Guy," "Star Wars,", "Blue Harvest," "filmsinfocus," "YouTube," and "Art Auction," and file type of M-JPEG. The first three tag terms, Family Guy, Star Wars, and Blue Harvest, are parsed and automatically generated from the title. The title needs to be parsed to removed symbols and words without useful meaning. For example, the "-" symbol and space in title do not yield any meaning and should not appear in the tag terms. In addition, the sentence "Did you see it?" also would be removed during parsing and would not appear as a tag term.

The fourth tag term, "filmsinfocus," is the author who loads the video into YouTube. The fifth tag term, "YouTube," is the source of the video. The video was found in the YouTube.com site by the search engine. The source of the video is also reflected in the object ID, which contains a source ID 777 and a video ID 136. The last tag term, "Art Auction," is entered by a user of the site. After the user view the video, the user decided that the video is related to Art Auction of arts or props used in creating the animated episode.

Of course, other tag terms can be added to column 303 of row 311 after more users view the clip (or video) and decide to add tags (or tag terms) for the video. FIG. 3A also includes a row 321 for a video also related to the Family Guy blue Harvest episode. Table 300 has a row 321 for another video related to the Family Guy Blue Harvest episode. Row 321 has an object ID 777148, a title of "Family Guy 'Star Wars'-R2D2 Shouting Abuse!," tag terms of "Family guy," "Star Wars," "R2D2," "Fatherjack1973," "YouTube," and "fighting," and file type of M-JPEG. The First three tag terms, "Family Guy," "Star Wars," and "R2D2," are parsed from the title of the video and are automatically added to the column 303 in row 321. The fourth tag term "Fatherjack1973" is the author who loads the video into YouTube. The fifth tag term, "YouTube," is the source of the video. The last tag term, "fighting," is entered by a user. The source of the video is also reflected in the object ID, which contains a source TD 777 and a video ID 148. After the user view the video, the user decided that the video shows fighting scenes. Additional objects can be entered in other rows of table 300. The data can be any type of files usable to the web site.

Figure 3B:
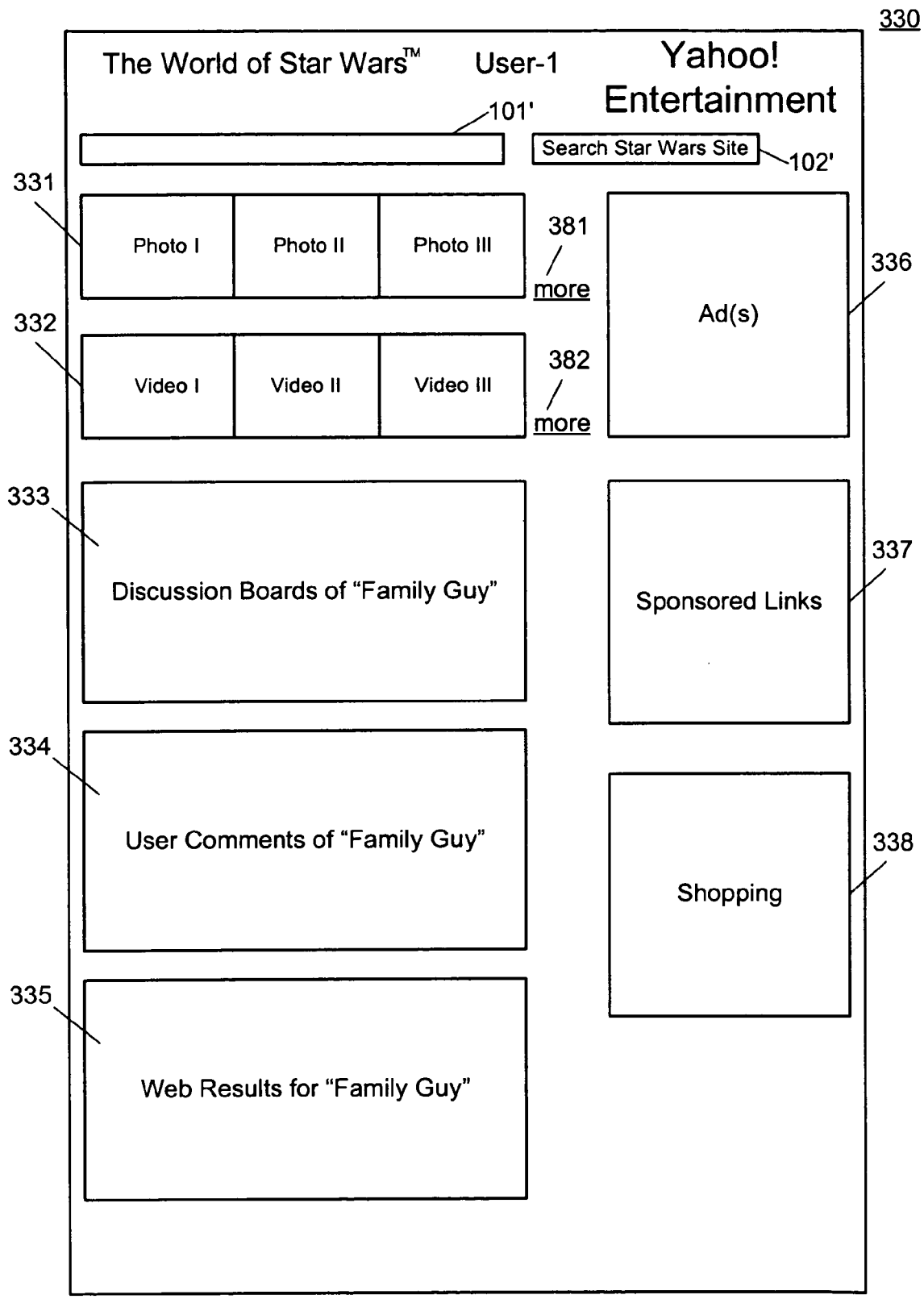
FIG. 3B shows an entity page based on the "Family Guy" episode, in accordance with one embodiment of the present invention.

The automatically generated tags (or tag terms) allow objects to be linked to (or associated with) one another way in meaningful ways. For example, a producer or an administrator of the site can create an entity page based on the subject of "Family Guy" Star Wars-™ Blue Harvest episode and places a link of "Family Guy" in area 166 for Star Wars™ TV shows of FIG. 1E. When a user hits the link in area 166, an entity page related to the Family Guy Star Wars™ episode appears. FIG. 3B shows a web page 330 that appears when a user clicks on the link of "Family Guy" in area 166 of FIG. 1E, in accordance with one embodiment of the present invention. Page 330 has an area 331 that includes a number of photos, such as photo-I, photo-II, and photo-III, which are all related to Family Guy. Alternatively, above area 331 there could be another area (not shown) that display an introduction of the Family Guy Star Wars™ episode. Below area 331, there is an area 332 that displays clips related to the Family Guy Star Wars™ episode. In addition, there is an area 333 of discussion boards (and/or threads) related to the "Family Guy" episode and an area 334 of User comments of the "Family" Guy episode.

The contents in areas 331 and can be pulled together because the photos and videos all have the tag terms "Family Guy." Additional photos and videos can be found by accessing the more buttons 381 and 382 next to areas 331 and 332. The Discussion boards (or threads) can be chosen to be displayed in area 333 either because the boards have titles containing the phrase "Family Guy," or the boards being tagged with tag term "Family Guy." Similarly, the user comments displayed in area 334 likely have the term "Family Guy" in titles or contents, etc. Additionally, an area 335 that list web search results using the search keyword "Family Guy." On the right side of the page 330, there could be an area 336 for advertisement(s). The ad(s) can be related to the Family Guy episode. But, ad(s) does not need to be related to the Family Guy episode. Further, on page 330, there could be an area 337 for sponsored links and an area 338 for shopping. Both areas 337 and 338 are sponsored by advertisers (or merchants) and the contents in these two area can be related to the "Family Guy" episode. Since the show was very popular, many products related to the episode have since appeared on the market.

Automatically generating tags for the objects using the metadata that came with the data allow these objects to be associated with one another. In the example above, auto-tagging of the objects with the tag term "Family Guy" allow the photos in area 331 and videos in area 332 be pulled together and appear in the entity page. Of course, as discussed above, tagging of objects enable the objects to be searchable. With the automatically generated tag terms, such as "Family Guy," "Blue Harvest," and "R2D2," etc., discussed above for FIG. 3A, these auto-tagged objects are searchable under the automatically generated tag terms. If automatically generated tag terms include authors (or creator, or the person who loads the objects to the site), or sources of the data (such as "YouTube"), they also can be searched under authors or sources.

Objects that are identified by the search engine to be content for the web site by using the site creation page 230 of FIG. 2C could be automatically tagged with the terms that they are associated with. In the example shown in FIG. 2C, Star Wars™, Darth Vader, Yoda, and Han Solo, etc. are terms used to search in Internet sites for contents, which should be in the metadata of the objects identified. Objects that are identified by the "Star Wars" term should be tagged with "Star Wars." Similarly, objects that are identified with "Darth Vade", "Yoda", or "Han Solo," should be tagged with the corresponding terms. One can define this type of auto-tagging as tier-1 tagging, because the automatically generated tag terms are related to terms used to generate the site. The other automatically generated tag terms that are parsed from additional metadata, such as titles, descriptions, existing tags, sources, and authors, etc., that come with the objects can be defined as tier-2 tagging. Tier-2 tagging are automatically generated. The third type of tagging is generated by users. Users see objects and enter tag terms that they consider suitable for the objects. User tagging can be defined as tier-3 tagging. Tier-1, tier-2, and tier-3 taggings all add values and meanings to the objects and are all useful to create relationships between objects. Tier-1, tier-2, and tier-3 tagging also enable objects it the web site to be searchable. In one embodiment, tag terms from different tier levels, such as tier-1, tier-2, and tier-3, are treated equally. No weighting is assigned to tag terms from different tier levels during search. In another embodiment, tag terms from different tier levels are assigned different weighting to give preference to one tier over another during searching.

In one embodiment, the metadata of different objects are compared to identify common terms. If more than one objects have a common term, the common term can be considered a tag term. For example, metadata of different objects from the "Family Guy" episode stored in the databases are analyzed to find a common term of "Family Guy," in many subjects. Therefore, the term "Family Guy" can be considered to be a tag term. Similarly, analyzing the metadata of videos from YouTube would reveal that "YouTube" could be a tag term, since many objects (videos) have this term in the metadata. In contrast, the term "Did you see it" that appears only with one of the video might not be a good candidate for tag terms, if not other objects in the database have the term. However, if the producer and/or administrator of the site consider certain tag terms, such as YouTube, do not add value to users in terms of searching, the producer and/or administrator can create a list of terms that would not become tag terms for objects in the database.

Figure 3C:
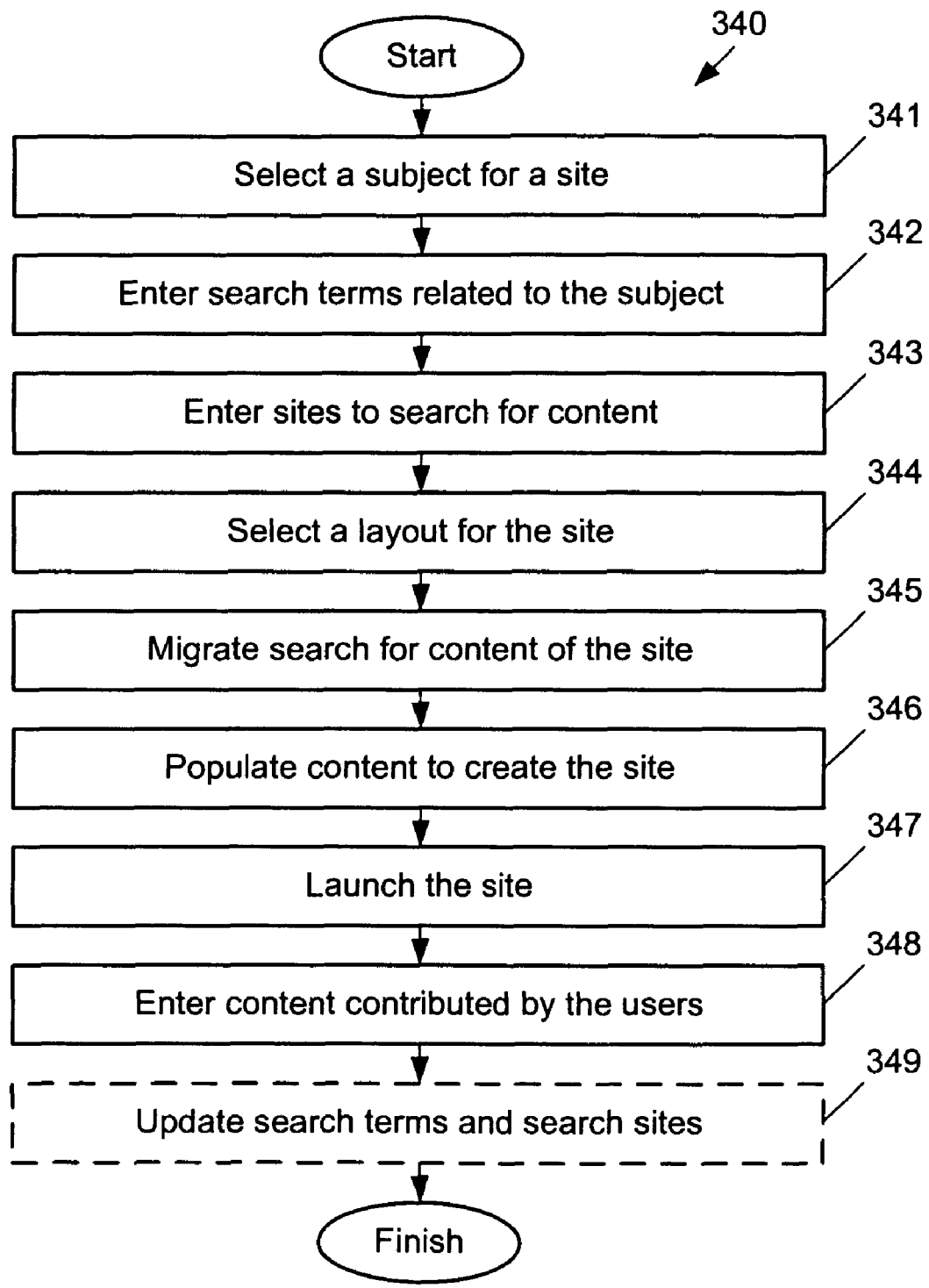
FIG. 3C shows a process flow for automatically creating a subject-based site, in accordance with one embodiment of the present invention.

FIG. 3C shows a process flow 340 for automatically creating a site, such as the Star Wars™ site discussed above, in accordance with one embodiment of the present invention. At operation 341, a subject of a site is selected (or determined). For example, the subject of the site can be "Star Wars™." At operation 342, a list of search terms related to the subject of the site is entered to a form created to search for content available on the Internet. For example, the list of search terms entered can be "Darth Vader," "Yoda,", and "Han Solo," etc., as listed in FIG. 2C. At operation 343, a list of sites on the internet is entered to determine which sites for a search engine of the system to search for content relevant to the site. The list of sites will be searched for content related to the search terms entered at operation 342 and the subject determined at operation 341. At operation 344, a layout for the site is selected. Different types of sites might need different types of layout designs of the sites. For example, a fan site related to a particular sport or a particular athlete can be different form a fan for a particular movie(s). The layout (or design) of the site determines what types of content and functionalities are offered to the site users. For example, the layout determines whether the site will display photos, videos, and music, and also what types of functionalities, such as discussion boards, blogs, and user comments, are offered. Once the layout is determine, the search for content for the site can be initiated at operation 345. Alternatively, the content search can occur before the layout is determined. At operation 346, the content collected from these selected sites on the Internet are used to populate the databases of the site (or populate the content of the site) to create the site. After the databases of the site are sufficient populated, at operation 347, the new site is launched and becomes accessible by users. Once users start to use the site, users would contribute content to the site by uploading files, joining discussion, and entering texts in blogs. At operation 348, the content contributed by users is entered by the system to update content of the site. At the same time the users are adding content to the site, the search engine for the site continues to search for new content available oil the Internet. The administrator can update search terms and search sites for content for the site. For example, a new Internet site might be chosen to search for content. At an optional operation 349, the search terms and search sites in the form(s) used operation 342 and 343 are updated by the administrator. This step is optional because the administrator does not need to update the search terms and search sites.

Figure 3D:
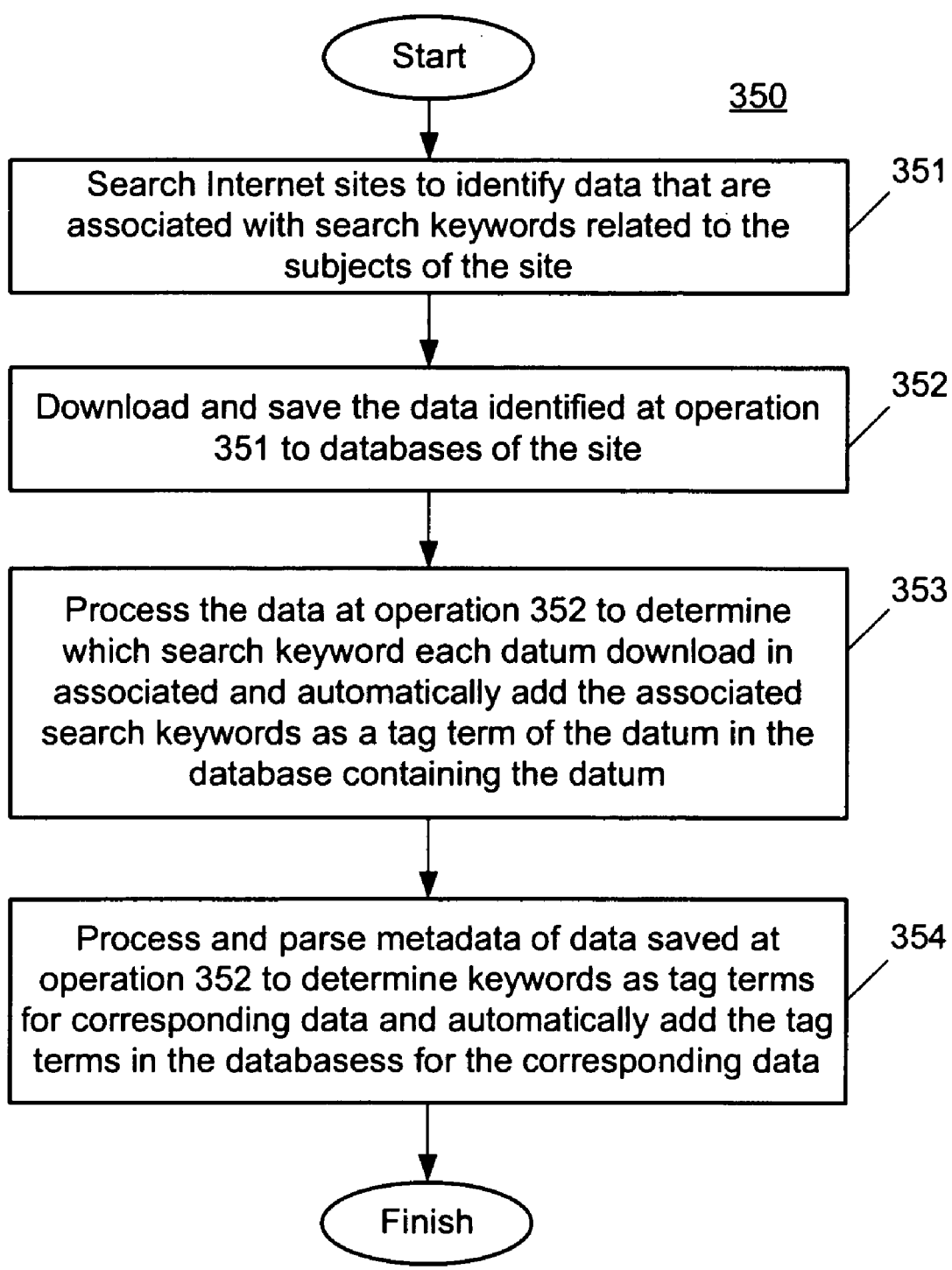
FIG. 3D shows a process flow for automatically generating tag terms for objects in databases of a web site, in accordance with one embodiment of the present invention.

FIG. 3D shows a process flow 350 for automatically generating tag terms for objects in databases of the web site, in accordance with one embodiment of the present invention. At operation 351, search Internet sites to identify data (or objects or content) that are associated with search keywords related to the subject of the web site. Examples of search keywords, such as Star Wars™, Darth Vader, Yoda, and Han Solo, etc., are shown in FIG. 2C. Examples of Internet sites that are searched have also been discussed in FIG. 2C. At operation 352, the identified data or links to the data at operation 351 that are associated with the search keywords are downloaded and saved to the databases of the site. Some sites do not allow their data to be downloaded. Under such a circumstance, links, not data, are downloaded to the databases of the site. At operation 353, the downloaded and saved data or links to the data at operation 352 are processed to determine which search keyword each datum is associated with and automatically add the associated search keyword as a tag term for the datum. Alternatively, the identified data or links to the data at operation 351 can be processed to determine which search keywords the data are associated with prior to the data or links of the data being placed in the databases. The associated search keywords are tag terms for the data. Under such a circumstance, the data or links of the data and the associated tag terms (or search keywords) are entered it the databases of the site.

At operation 354, the metadata of each of the identified data are processed and parsed to determine keywords as tag terms for the corresponding datum and the tag terms are automatically entered for the corresponding datum in the database. As discussed above, the examples of metadata include titles, description, tag(s), authors (or creators, or dataloaders), sources of data. The metadata of data uploaded by users can also be processed and parsed to auto-tag the uploaded data.

Figure 3E:
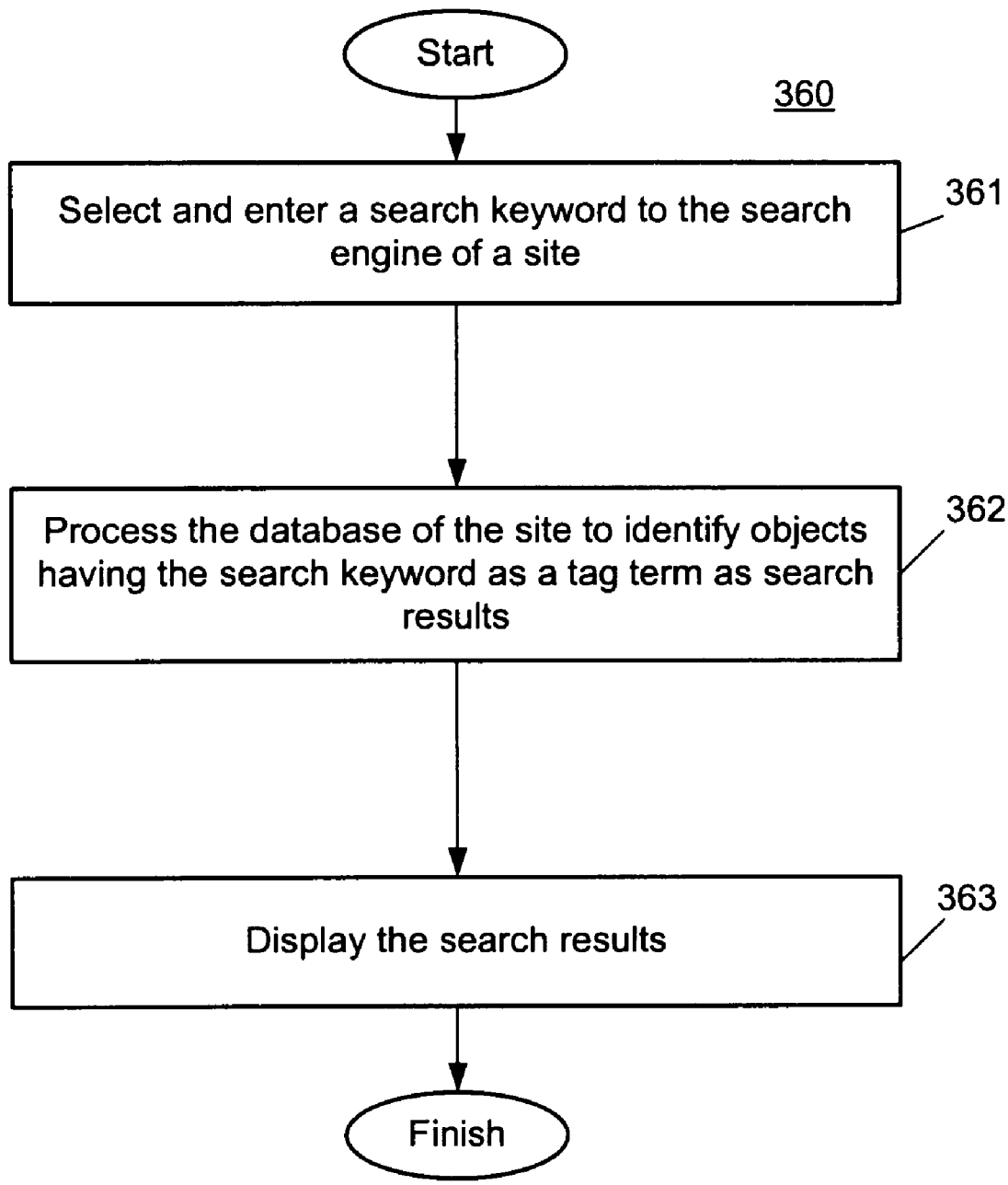
FIG. 3E shows a process flow for conducting a search of content of a web site, in accordance with one embodiment of the present invention.

FIG. 3E shows a process flow 360 of using a tag term to search databases of the web site to identify associated objects in the databases, in accordance with one embodiment of the present invention. The tag term can be automatically generated or entered by users of the site. At operation 361, a search keyword, which can be a word or a phrase, is selected and entered by a user of the site to a search engine of the site. The user can also be a producer or an administrator of the site. At operation 362, the databases of the site are processed to identify objects having the tag term selected by the user as search results. At operation 363, the search results are displayed. The identified objects can be organized and displayed in an entity page centered on the subject of the selected tag term. Alternatively, the identified objects can be displayed in a search result page.

Figure 4A:
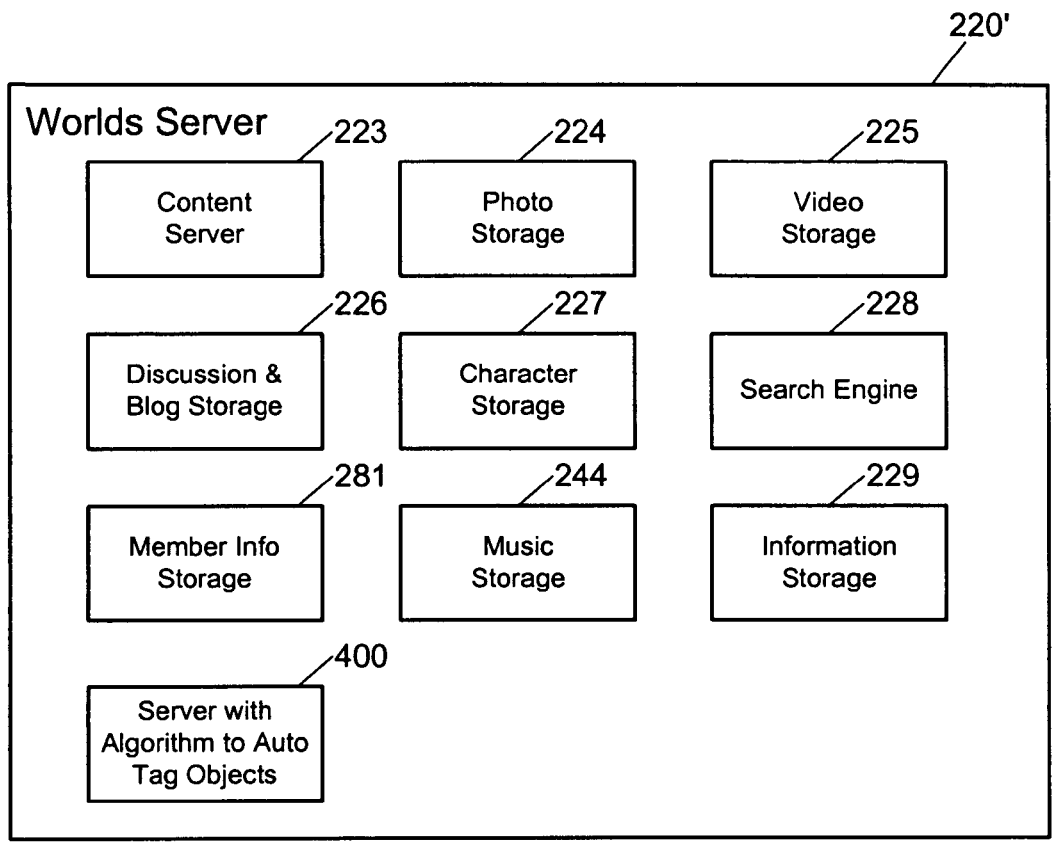
FIG. 4A shows the components in a Worlds server, in accordance with one embodiment of the present invention.
Figure 4B:
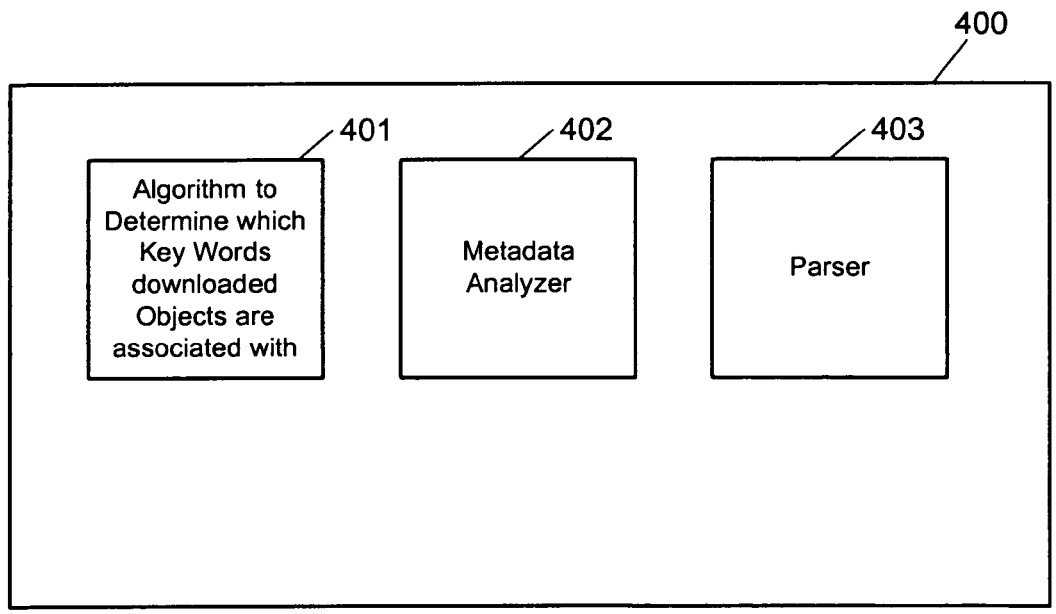
FIG. 4B shows components in a server with algorithm to automatically generate tag terms for objects in a web site, in accordance with one embodiment of the present invention.

FIG. 4A shows the components in the Worlds server 220', in accordance with one embodiment of the present invention. In addition to the components shown in FIG. 2B, worlds server 220' has a server 400 with algorithm to auto-tag the objects in the databases of the site. The algorithm enables processing the objects (or data) in databases of the site to identify tag term(s) associated with the search keywords used to automatically generate the site for each corresponding datum and to identify tag term(s) from metadata for each corresponding datum. FIG. 4B shows the components of server 400 of FIG. 4A, in accordance with one embodiment of the present invention. Server 400 includes an algorithm 401 to determine which keywords the objects downloaded from Internet are associated with. Server 400 also has a metadata analyzer 402 that collects and processes the metadata of objects (or data) in the databases. The metadata analyzer 402 works with a parser, which parses the text, which can be alphabets, symbols and numbers, processed by the metadata analyzer 402 to identify keywords for corresponding objects as tag terms.

Automatically generating tag terms for data (or objects) in the databases of the web site enable searching for objects in the web site without users' tagging. Users' tagging can add additional meaning and metadata to the data (or objects). Auto-tagging can generate tag terms from metadata that come with the data without intervention from a human. The amount of tags generated by auto-tagging can be very significant. Producers, administrator, and users of the site can utilize the tags to display or find related objects. Auto-tagging, similar to user tagging, also allow objects in the databases to be associated with one another, which makes the site content more meaningful and interesting.

The web site created is supposed be maintained with minimal resources, such as by system administrators. The home page of the web site, such as page 150 of FIG. 1E, is designed to present information that is most updated and most popular to users. In the beginning of constructing of the web site, when no or few users have accessed the web site, the administrator can select the lead article in area 151, a few videos in area 159, and photos in area 160 of page 150. Alternatively, the system can be set up to populate these fields in the beginning by an algorithm, such as placing most updated article, videos, and photos in these fields. In another embodiment, these fields can be populated by article, videos, and photos that are most popular to the Internet users. The popularities of articles, videos, photos, and other types of files available on the Internet are usually known. Once users have used the site, users of the site can have more influence to the content in these fields. For example, these fields, 151, 159, and 160, can be populated by articles, videos, and photos, respectively, based on recency (newness) and popularity of the users of the site. Recency of a file reflects how new the file is. Users can be more interested in latest data. Alternatively, active contributors or users of the site can be enlisted to administer the site. For example, the most active contributor(s) can be enlisted to select lead article, feature photos, or feature videos, etc.

Similarly, the "latest comments" field 160 can be populated based on recency, since field 160 displays "latest" comments. The various fields and areas on web pages of the site can be populated by content based on algorithms set up by the system creator(s), or system administrator(s). The system administrator can always interview to take down inappropriate content or to remove offensive users. The site can include features to allow users to report inappropriate users or inappropriate user activities on the site. However, the goal is to have the site almost automatically run with limited involvement of paid personnel. Users' contribution of content and interaction with the site keep the content of the web site updated, fresh and interesting. The site is "alive" with users' inputs. In addition, the search engine for the site continues to search for content from the relevant web sites on the Internet to keep the content of the site fresh and updated.

Such a site that is created by an automatic system and method reduces the time and money needed to create and maintain the site. In addition, using the fresh content available on the Internet, content contributed by the users, and inputs (such as discussion, tagging, etc.) from the users, the site can capture information that is most relevant and interesting to the users.

Although the exemplary web site ("The World of Star Wars™", site) discussed above resides in a portal (Yahoo!), web sites created and maintained in the manner described above does not need to be part of a portal. Web sites created and association can be used to in any site that allow users to tag objects in the site and to use the hard association of objects to select objects for displaying and to display the hard association of objects through links described above.

Embodiments of the present invention provide automatic systems and methods for creating a web site based on a particular subject using information available on the Internet. As discussed above, creating and maintaining a web site with updated content can be very time and resource consuming. Therefore, it is desirable to create and maintain such a site with an automatic system and method using information available on the Internet. To create such a site, the subject of the web site is determined first. Afterwards, search terms related to the subject of the web site are entered to conduct searches on the Internet for information relevant to the web site. The search results are used to populate databases for this web site. After the web site is created and launched, users of the site can contribute to the content of the site. User contribution of additional content to a web site keeps the web site updated and interesting to all users of the site. Further, searching on Internet sites is configured to continuously add content that is new and relevant to the web site. In addition, active users of the web site can engage in basic administration of the site, which reduces the need of intervention by paid administrators. Thus, by obtaining content from Internet sites, coupled with contributions made by users, it is possible to automatically create and maintain new custom created sites with minimal intervention by paid administrators.

With the above embodiments in mind, it should be understood that the invention might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data, which can be thereafter read by a computer system. The computer readable medium may also include an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The above-described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for automatically generating tag terms for objects in databases of a web site that is automatically created based on a subject, comprising:

receiving a plurality of search terms related to the subject to create the web site;

searching Internet web sites to identify information associated with the plurality of search terms on the Internet web sites to automatically create the web site;

storing an identified information associated with the plurality of search terms as an object to a database of the web site;

processing the identified information to determine which one of the plurality of search terms the identified information is associated with;

wherein the identified information associated with the plurality of search terms to be used as content of the web site includes one or more of photos, music, videos, and articles;

automatically generating a tag term for the identified information in the database using the one of the plurality of search terms determined to be associated with the identified information;

processing and parsing any additional metadata of the identified information stored as an object to determine keywords to be used as additional tag terms for the identified information, the processing and parsing removing symbols and words without functionality as tag terms for the identified information; and automatically storing the additional tag terms as automatically generated tag terms for the identified information in the database;

wherein the automatically generated tag terms for the identified information enable the identified information to be searched and to be associated with other objects in the databases on the web site without user involvement;

automatically generating the web site and populating the web site with the identified information, the web site including a search box; and in response to receiving a search query at the search box, searching the automatically generated tag terms.

2. The method of claim 1, wherein the any additional metadata of the identified information include at least one in the group consisting of title, description, author, and source of the identified information.

3. The method of claim 1, wherein the tag terms for the identified information stored as the object in the database can be added by users of the web site.

4. The method of claim 1, wherein the processing of the any additional metadata involves identifying a common term in the any additional metadata that exists in metadata of other objects in the database of the web site, the common term determined as a keyword for the identified information.

5. The method of claim 1, further comprising:
determining the subject for the web site prior to receiving the plurality of search terms related to the subject.

6. The method of claim 1, wherein at least a portion of content of the web site automatically created based on the subject comes from information available on the Internet.

7. A system for automatically generating tag terms for objects in databases of a web site that is automatically created based on a subject, comprising:
a search engine for searching information available on Internet based on a plurality of search keywords related to the subject of the web site to enable automatically creating the web site;
at least a server for automatically creating the web site and storing objects in the databases of the web site, wherein the objects in the databases are composed of information based on search results identified by the search engine to be associated with the plurality of search keywords, wherein the information associated with the plurality of search keywords to be used as content of the web site includes one or more of photos, music, videos, and articles; and
a server with an algorithm to automatically generate tag terms from metadata of the objects to store in databases along with the objects, wherein the automatically generated tag terms for the objects enable the objects to be searched and to be associated with one another;
a page server for generating a web page of the web site, the web page defining a content area related to the subject of the web site, the content area of the web page populated based on a search of the automatically generated tag terms.

8. The system of claim 7, wherein the server with the algorithm to automatically generate tag terms includes:
an algorithm to determine which search keywords the objects in the databases are associated with to automatically generate tag terms for the objects based on the associated search keywords;
a parser for parsing the metadata of the objects, the parsing including removing symbols and words without functionality as tag terms for the identified information; and
a metadata analyzer working with the parser to process and analyze the metadata of the objects stored in the databases to determine keywords to be used as tag terms for the objects.

9. The system of claim 7, wherein the search engine also index content of the web site to enable searching for contents in the web site, and wherein tag terms of objects in the databases enable searching of objects in the web site.

10. The system of claim 8, wherein the processing and analyzing of the metadata involves identifying a keyword that exists in more than one object in the database of the web site to be used as a tag term.

11. A method for automatically generating tag terms for objects in databases of a web site that is automatically created based on a subject, comprising:
receiving a plurality of search terms related to the subject to create the web site;
searching Internet web sites to identify information associated with the plurality of search terms on the Internet web sites to automatically create the web site;
storing an identified information associated with the plurality of search terms as an object to a database of the web site;
processing the identified information to determine which one of the plurality of search terms the identified information is associated with;
wherein the identified information associated with the plurality of search terms to be used as content of the web site includes one or more of photos, music, videos, and articles;
automatically generating a tag term for the identified information in the database using the one of the plurality of search terms determined to be associated with the identified information;
processing and parsing any additional metadata of the identified information stored as an object to determine keywords to be used as additional tag terms for the identified information, the processing and parsing removing symbols and words without functionality as tag terms for the identified information; and
automatically storing the additional tag terms as automatically generated tag terms for the identified information in the database;
wherein the automatically generated tag terms for the identified information enable the identified information to be searched and to be associated with other objects in the databases on the web site without user involvement;
generating a web page of the web site, the web page defining a content area related to the subject of the web site;
populating the content area of the web page based on a search of the automatically generated tag terms.

12. The method of claim 11, wherein the any additional metadata of the identified information include at least one in the group consisting of title, description, author, and source of the identified information.

13. The method of claim 11, wherein the tag terms for the identified information stored as the object in the database can be added by users of the web site.

14. The method of claim 11, wherein the processing of the any additional metadata involves identifying a common term in the any additional metadata that exists in metadata of other objects in the database of the web site, the common term determined as a keyword for the identified information.

15. The method of claim 11, further comprising:
determining the subject for the web site prior to receiving the plurality of search terms related to the subject.

16. The method of claim 11, wherein at least a portion of content of the web site automatically created based on the subject comes from information available on the Internet.

17. The method of claim 1, further comprising,
assigning a first weighting value to the tag term generated using the one of the plurality of search terms;
assigning a second weighting value to the additional tag terms; and
wherein searching the automatically generated tag terms includes searching both the tag term generated using the one of the plurality of search terms and the automatically generated tag terms based on the assigned first weighting and assigned second weighting, respectively.

* * * * *